United States Patent [19]

Nakao et al.

[11] Patent Number: 5,737,437
[45] Date of Patent: Apr. 7, 1998

[54] ADDRESS REGION DETECTING APPARATUS USING CIRCUMSCRIBED RECTANGULAR DATA

[75] Inventors: Akihiko Nakao; Nobuaki Takagi; Yoshikatu Nakamura, all of Yokosuka, Japan

[73] Assignee: Kabushiki Kaisha Toshiba, Japan

[21] Appl. No.: 413,890

[22] Filed: Mar. 30, 1995

[30] Foreign Application Priority Data

Mar. 31, 1994 [JP] Japan ............................ 6-064005

[51] Int. Cl.$^6$ .......................................... G06K 9/00
[52] U.S. Cl. ............................ 382/101; 382/180
[58] Field of Search ......................... 382/101, 102, 382/177, 180, 286, 292; 209/584, 900

[56] References Cited

U.S. PATENT DOCUMENTS

| | | | |
|---|---|---|---|
| 4,158,835 | 6/1979 | Miura et al. | 340/146.3 H |
| 4,481,665 | 11/1984 | Ota | 382/48 |
| 4,484,348 | 11/1984 | Shizuno | 382/48 |
| 5,321,768 | 6/1994 | Fenrich et al. | 382/9 |

FOREIGN PATENT DOCUMENTS

| | | | |
|---|---|---|---|
| 55-127677 | 10/1980 | Japan | 382/101 |
| 2 230 633 | 10/1990 | United Kingdom | 382/177 |

OTHER PUBLICATIONS

Yeh et al., "Address Location on Envelopes," *Pattern Recognition*, vol. 20, No. 2, 1987, pp. 213–227.

*Primary Examiner*—Andrew Johns
*Attorney, Agent, or Firm*—Cushman Darby & Cushman Intellectual Property Group of Pillsbury Madison & Sutro LLP

[57] ABSTRACT

In an apparatus for detecting an address region on postal matter, an image having address information of the postal matter is converted to a digital signal, and a region associated with the digital signal is found. The associated region is converted to rectangular data indicating a rectangular region circumscribed with the associated region. The rectangular data is subjected to predetermined processing and compared with already known information, thereby easily and exactly effecting address region judgment.

25 Claims, 21 Drawing Sheets

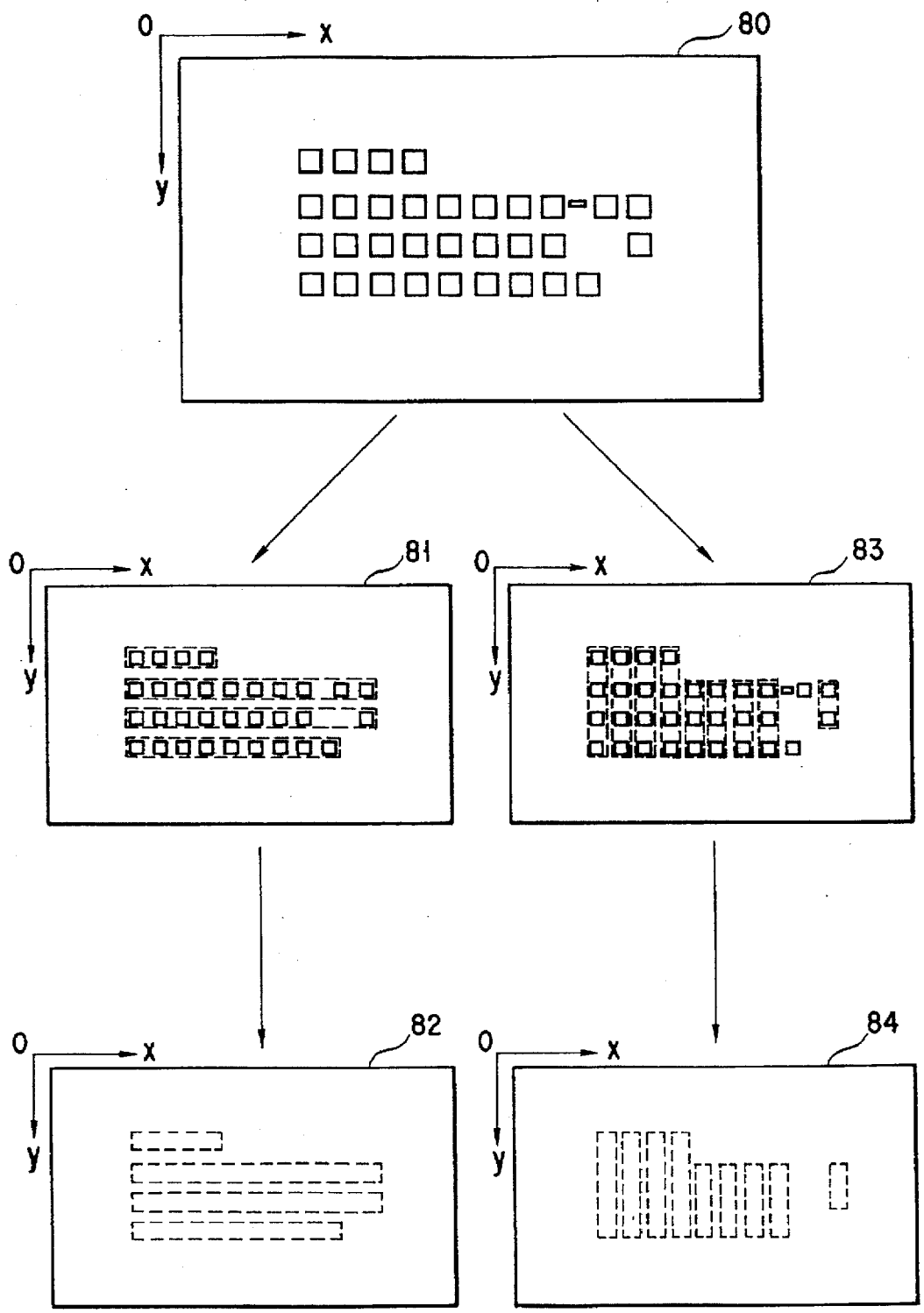
F I G. 12

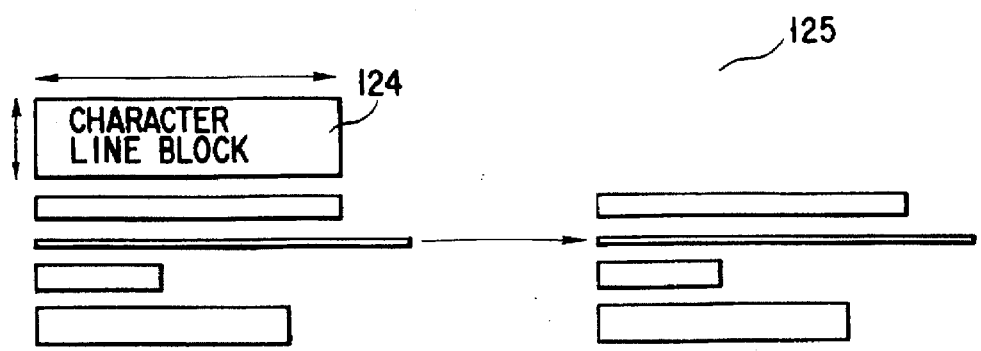
F I G. 15
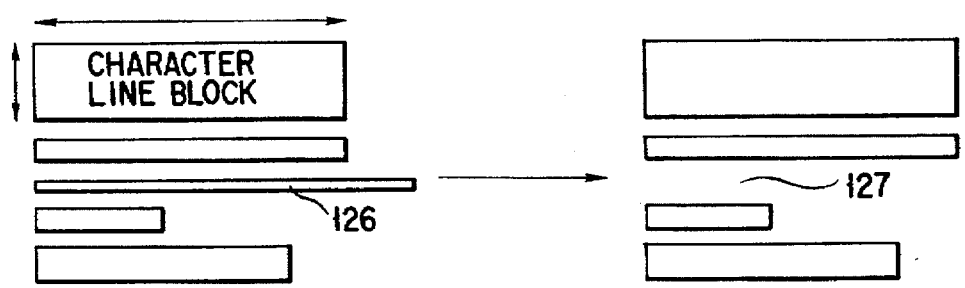
F I G. 16
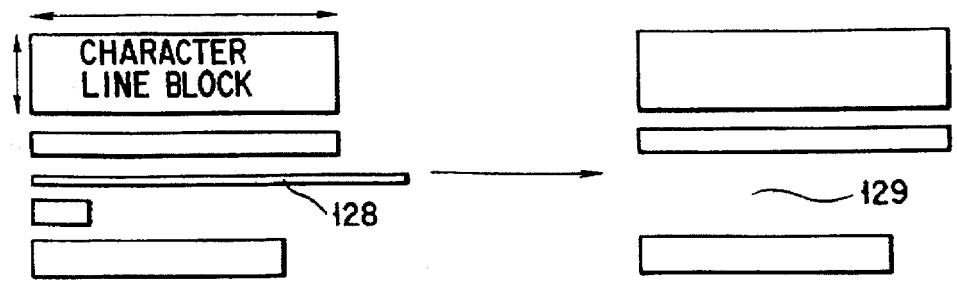
F I G. 17

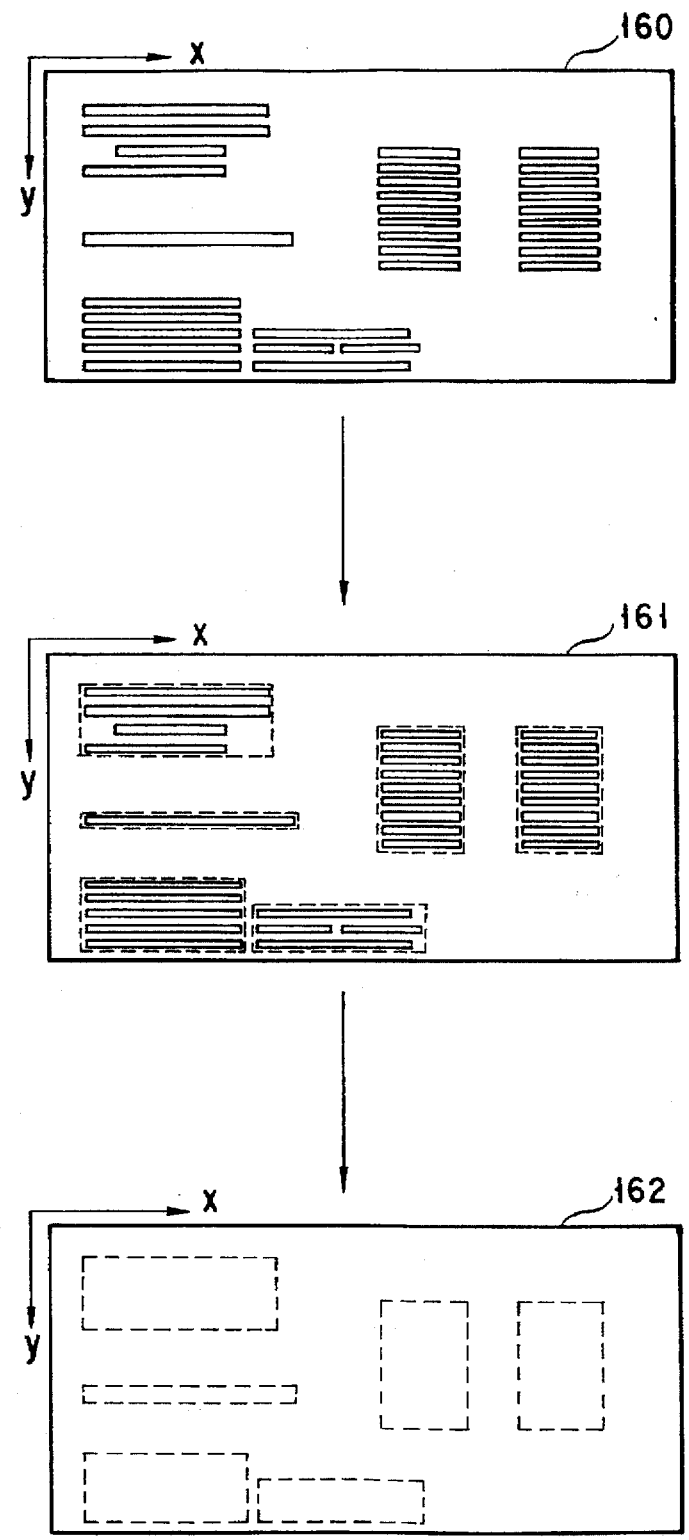
F I G. 19

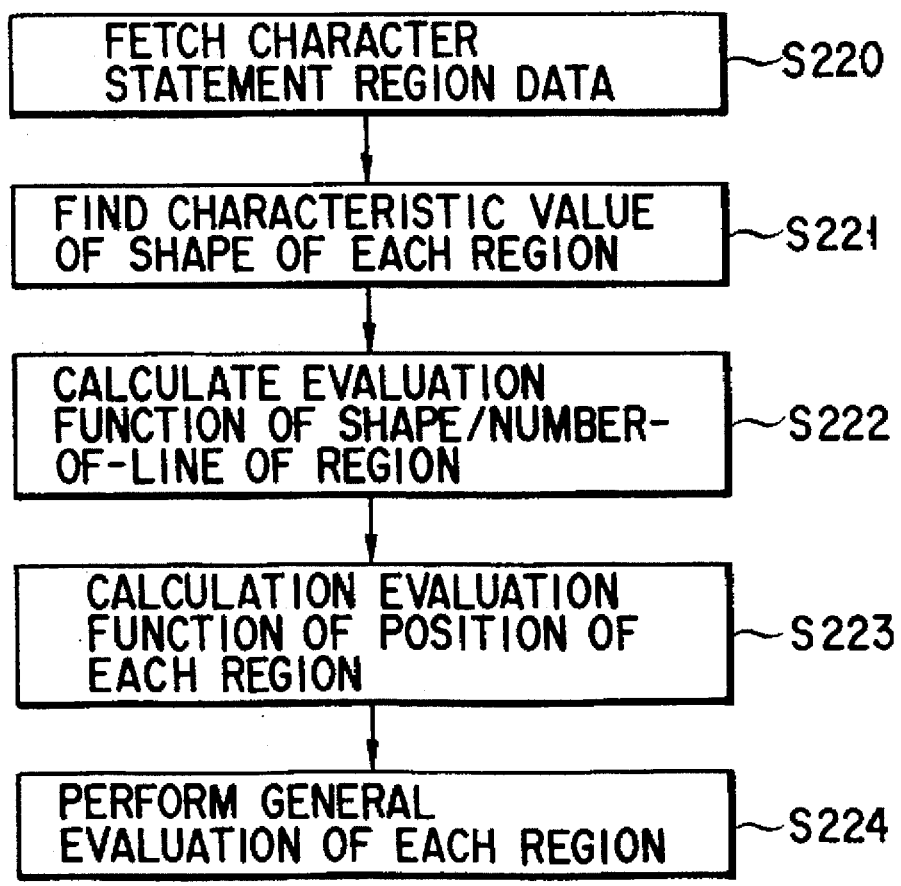
F I G. 24

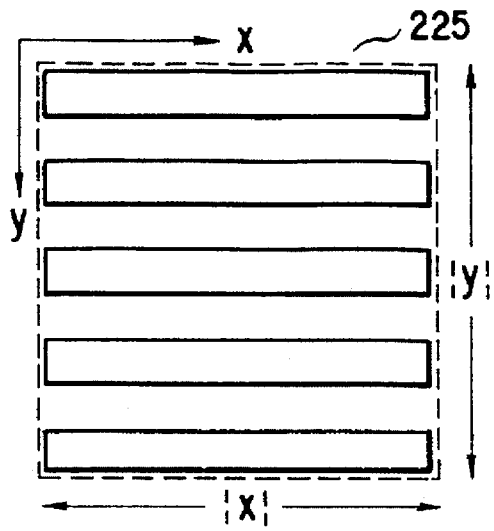
FIG. 25A1
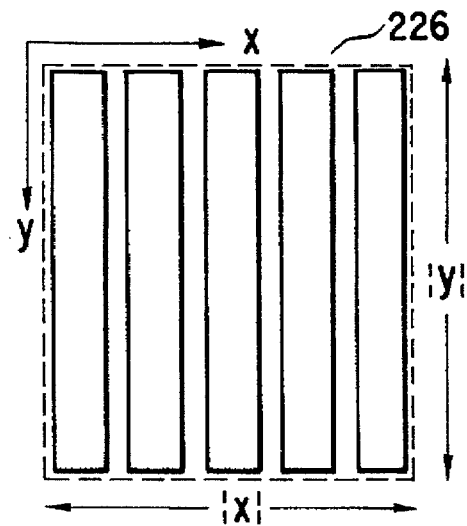
FIG. 25A2
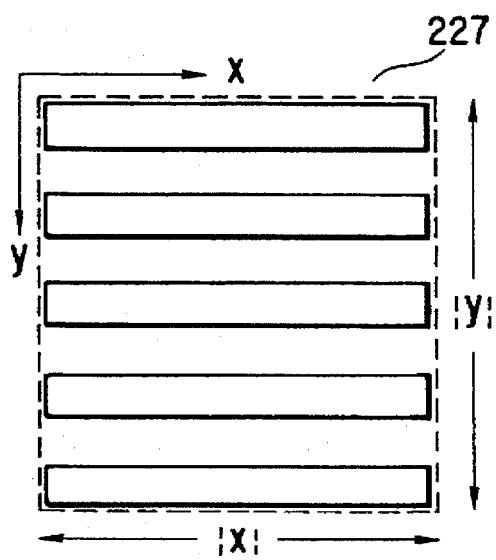
FIG. 25B1
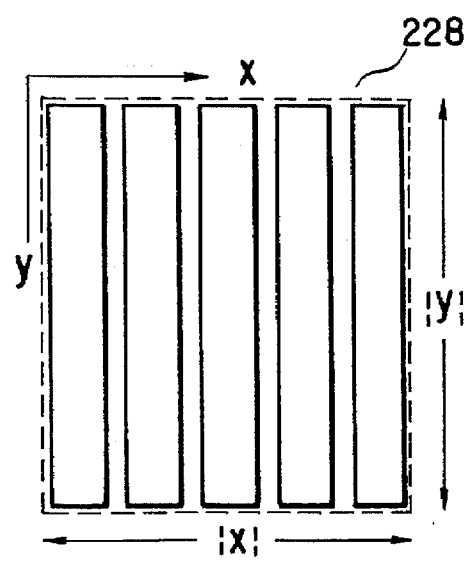
FIG. 25B2

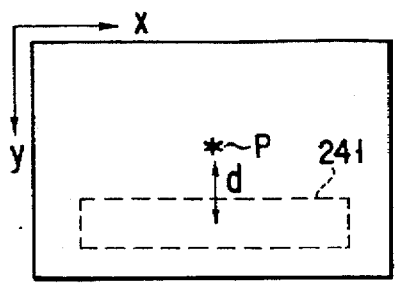
F I G. 26
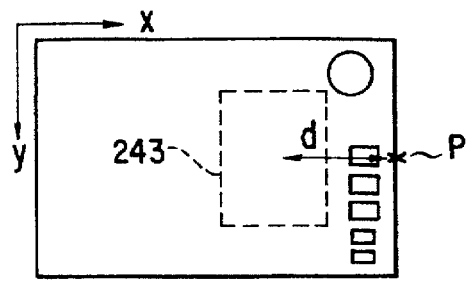
F I G. 27
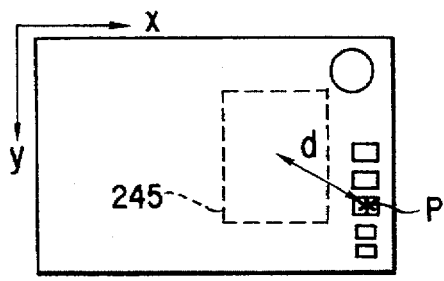
F I G. 28
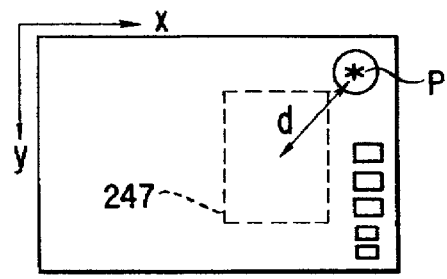
F I G. 29
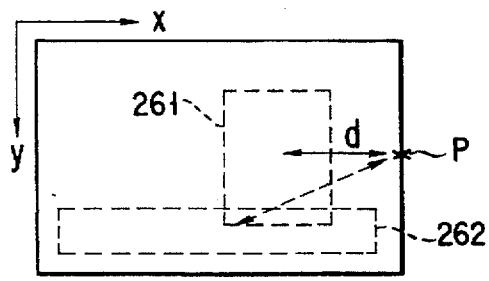
F I G. 30
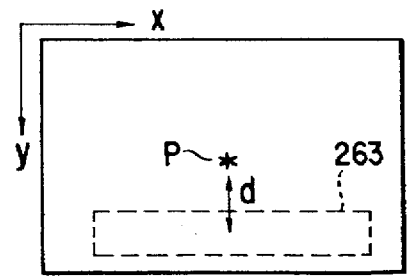
F I G. 31A
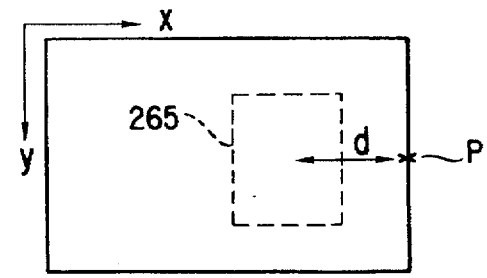
F I G. 31B

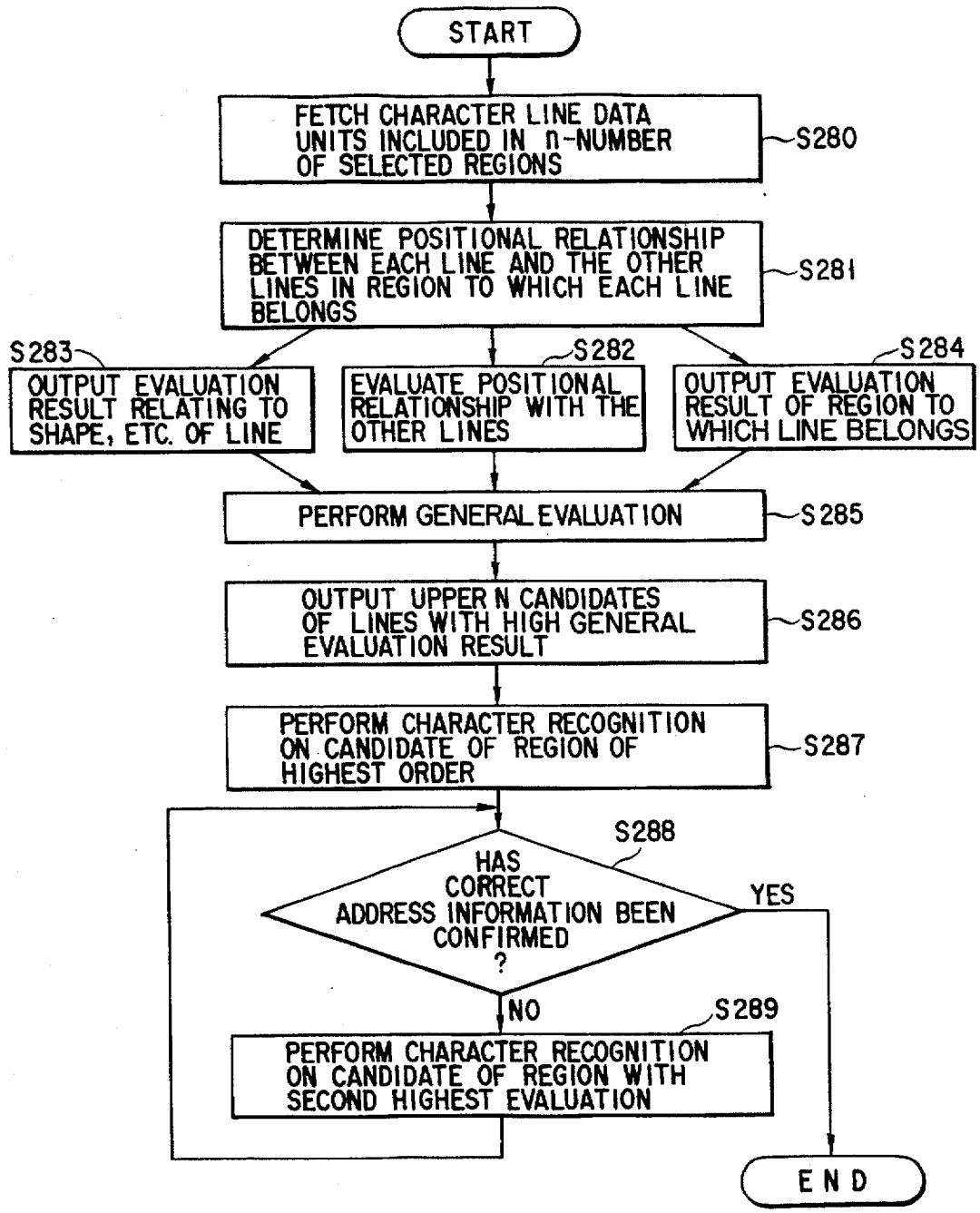
F I G. 32

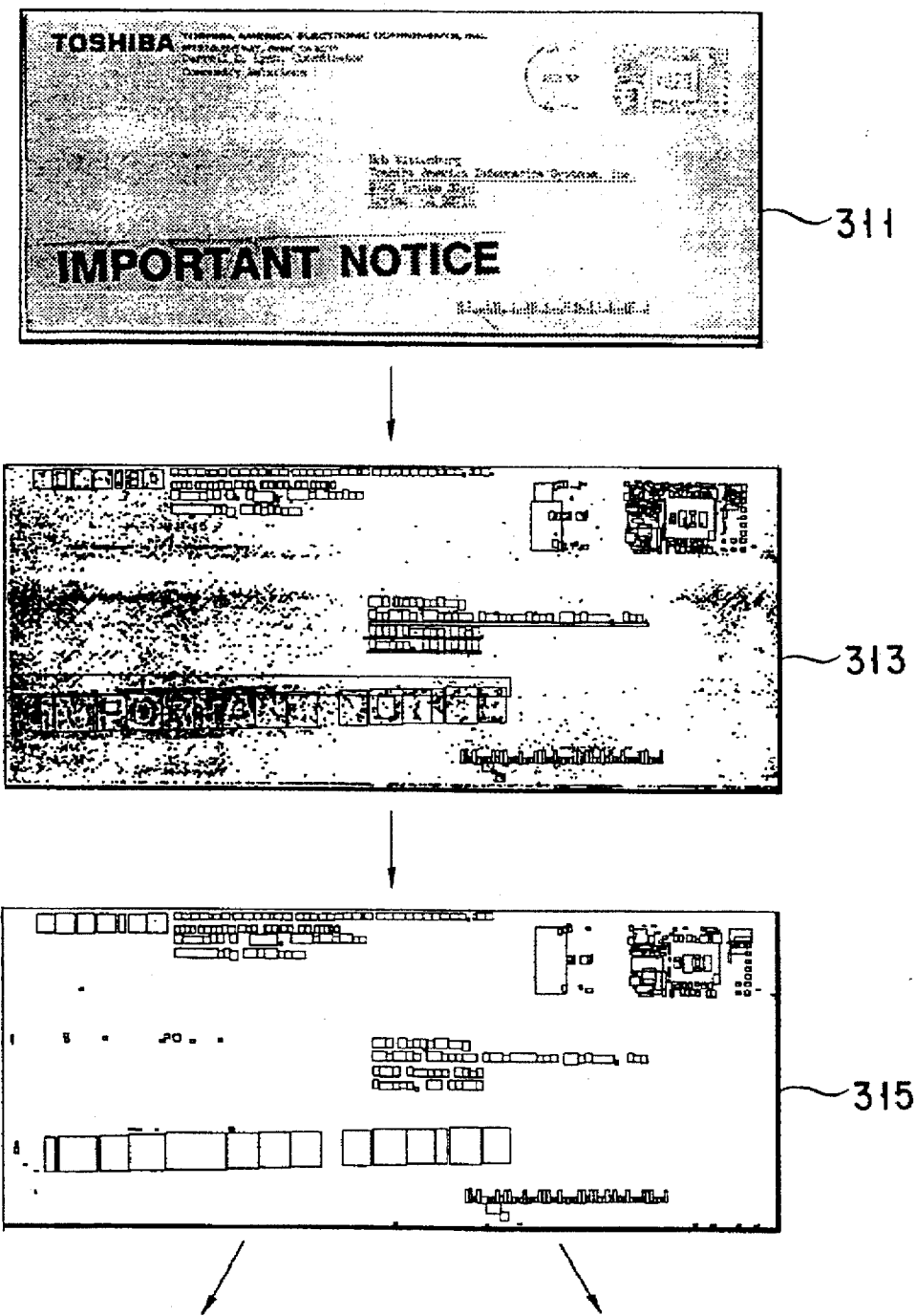
F I G. 33A

| DISTANCE FROM P1 ℓ[cm] | 0<ℓ≤4 | 4<ℓ≤10 | 10<ℓ≤13 | 13<ℓ≤16 | 16<ℓ≤20 | 20<ℓ |
|---|---|---|---|---|---|---|
| EVALUATION VALUE Ed | 80 | 100 | 90 | 85 | 70 | 50 |

F I G. 35

| r = |x|/|y| (WHEN X DIRECTION) | 0<r≤1 | 1<r≤2 | 2<r≤10 | 10<r |
|---|---|---|---|---|
| EVALUATION VALUE Er | -50 | -10 | 10 | -10 |

F I G. 36A

| r = |y|/|x| (WHEN Y DIRECTION) | 0<r≤1 | 1<r≤2 | 2<r≤10 | 10<r |
|---|---|---|---|---|
| EVALUATION VALUE Er | -50 | -10 | 10 | -10 |

F I G. 36B

| NUMBER OF LINES n | n=1 | n=2 | 3≤n≤5 | 6≤n≤7 | 8≤n≤9 | 10≤n |
|---|---|---|---|---|---|---|
| EVALUATION VALUE En | -15 | -10 | 0 | -10 | -15 | -40 |

F I G. 37

| AREA | ℓ[cm](Ed) | r (Er) | n (En) | $E_{TOTAL} = E_d + E_r + E_n$ | RANK |
|---|---|---|---|---|---|
| A | 22.0 (50) | 5.3 (10) | 1 (-15) | 45 | 4 |
| B | 16.0 (85) | 8.0 (10) | 9 (-15) | 80 | 2 |
| C | 9.0 (100) | 4.8 (10) | 4 (0) | 110 | 1 |
| D | 8.5 (100) | 12.5 (-10) | 1 (-15) | 75 | 3 |
| E | 11.0 (90) | 1.1 (-10) | 11 (-40) | 40 | 5 |

F I G. 38

ADDRESS REGION DETECTING APPARATUS USING CIRCUMSCRIBED RECTANGULAR DATA

BACKGROUND OF THE INVENTION

1. Field of the Invention

The present invention relates to an address region detecting apparatus for detecting an address region on postal matter, in which address information is stated, in a mail processing apparatus such as a mail address automatic read and sort apparatus.

2. Description of the Related Art

In the field of mail processing, there is a demand that a great deal of daily mail be processed within a limited time period. To meet the demand, mechanical mail processing has been developed and the work load of post-office clerks has been decreased. An example of an apparatus for mechanical mail processing is a zip code automatic read/sort apparatus for reading zip codes on postal matter by using an optical character reader and sorting postal matter into units associated with a plurality of delivery areas according to the read result. Another example is a delivery sorting machine for reading address information on postal matter and sorting the postal matter into units associated with a plurality of delivery areas in accordance with the read result.

There is postal matter of various formats since the format of mail is not substantially restricted. In addition, character information, pictures and/or photographs, such as advertisements, appear on the mail. It is very difficult to correctly extract address information from such a mixture of information.

Since it is considered that the amount of mail will increase more and more, an address reading method with higher performance than in the prior art is demanded.

For example, as disclosed in "A Japanese Kanji Address Reader: Technological Advance from Experiment to Practical Use" published by TOSHIBA in the Fourth Advanced Technology Conference held at USPS (United STates Postal Service) in November 1990, in a conventional mail address automatic read/sort apparatus, when address information on mail is read, one region which is supposed to have address information is detected by image processing. The detected region is subjected to a pipe-line process of character line detection, character detection, character recognition and town name recognition.

In the above prior art, however, if an erroneous region is detected as an address region at the beginning, it is not possible to correctly recognize the address information in a subsequent process and a great deal of time is needed until it is finally determined that the detected region is not an address region. Accordingly, the method, in which a plurality of regions are subjected to a series of address recognition operations and then address information is finally recognized, is time-consuming and inefficient.

SUMMARY OF THE INVENTION

The object of the present invention is to provide an address region detecting apparatus for detecting an address region on postal matter quickly and exactly. According to the invention, there is provided an address region detection apparatus comprising: means for converting an image having address information on postal matter to a digital image signal formed of a digital electric signal; means for finding a pixel region associated with the digital image signal on the basis of the digital image signal; means for forming rectangular data indicating a rectangular region circumscribed with the pixel region; and means for detecting an address region having the address information on the basis of the rectangular data.

In the address region detection apparatus of the present invention, rectangular data on a rectangular region is found from image information of postal matter. For example, the size and distribution of the rectangular data are compared with those already known. Thus, the properties of the image data of each region can be easily understood. Therefore, an address area detection apparatus capable of determining the region more exactly than in the method of determining the properties of the region from simply digitized image information can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 12 illustrates a character line extraction process;

FIG. 15 illustrates the process for evaluating the extracted character line;

FIG. 16 illustrates the process for evaluating the extracted character line;

FIG. 17 illustrates the process for evaluating the extracted character line;

FIG. 19 illustrates a process for synthesizing character line blocks and detecting a character statement region;

FIG. 24 is a flow chart illustrating a process of evaluating an extracted character statement region;

FIGS. 25A1–25A2 and 25B1–25B2 illustrate a process of evaluating an extracted character statement region;

FIG. 26 illustrates a process of evaluating the position of a region;

FIG. 27 illustrates the process of evaluating the position of the region;

FIG. 28 illustrates the process of evaluating the position of the region;

FIG. 29 illustrates the process of evaluating the position of the region;

FIG. 30 illustrates a method of giving a reference point to be used in evaluating the position of the region;

FIGS. 31A and 31B illustrate the method of giving the reference point to be used in evaluating the position of the region;

FIG. 32 is a flow chart illustrating a process of generally evaluating address region candidates and successively outputting candidates from one with a higher evaluation value;

FIGS. 33A to 33C illustrate the steps of the address region detection process of the present invention;

FIG. 35 is a table showing values of an evaluation function relating to the position of the address region;

FIG. 36A is a table showing values of an evaluation function relating to the shape of the address region in the X-direction;

FIG. 36B is a table showing values of an evaluation function relating to the shape of the address region in the Y-direction;

FIG. 37 is a table showing values of an evaluation function relating to the number of lines of address regions; and FIG. 38 is a table relating to evaluation of each address region of the postal matter as shown in FIG. 34.

DETAILED DESCRIPTION OF THE PREFERRED EMBODIMENTS

An embodiment of the present invention will be described with reference to the accompanying drawings.

Figure 1:
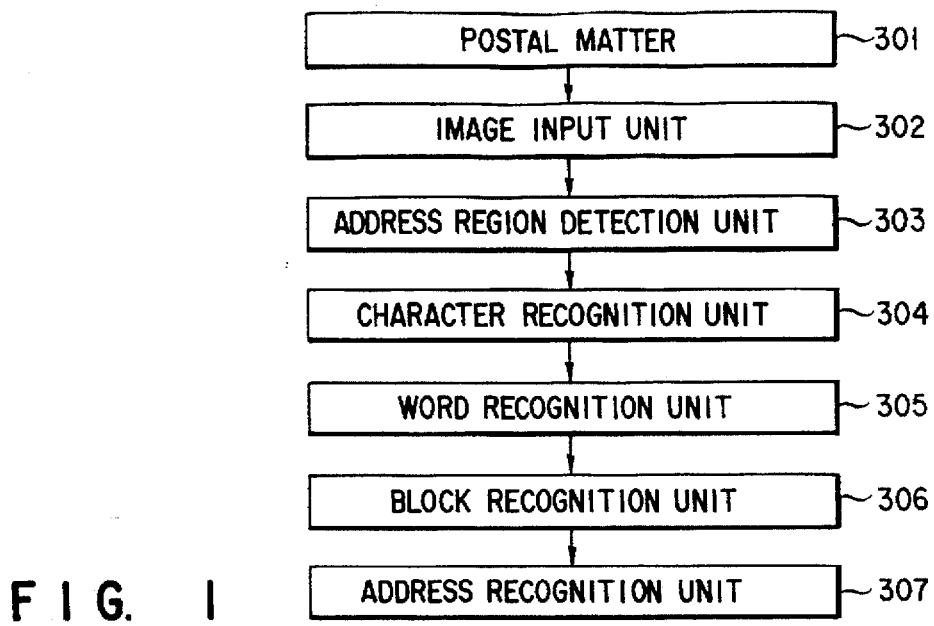
FIG. 1 is a block diagram showing schematically the structure of an address region detecting apparatus according to an embodiment of the present invention.

FIG. 1 shows schematically an address region detection apparatus according to the present embodiment. In FIG. 1, postal matter 301 to be processed is sent to an image input unit 302 by transfer means (not shown). In the image input unit 302, the postal matter 301 is optically scanned and a surface image is photoelectrically converted. Thereby, the image on the postal matter 301 is input and sent to an address region detection unit 303. In the address region detection unit 303, the image is subjected to image processing, as described later, and a plurality of character lines assumed to be a beginning portion of the address information are detected and sent to a character recognition unit 304. In the character recognition unit 304, characters are taken out from each character line one by one and recognized one by one. The recognition result is sent to a word recognition unit 305.

In the word recognition unit 305, the character recognition result sent from the character recognition unit 304 is collated with address information registered in an address data base. Thereby, the recognition result is corrected and a word recognition process is carried out. The recognition result is sent to a block recognition unit 306. In the block recognition unit 306. Information of "chome" (street number) and "banchi" (house number) stated near the recognized line is read to perform a block recognition process. The recognized result is output as address recognition result 307.

Figure 2:
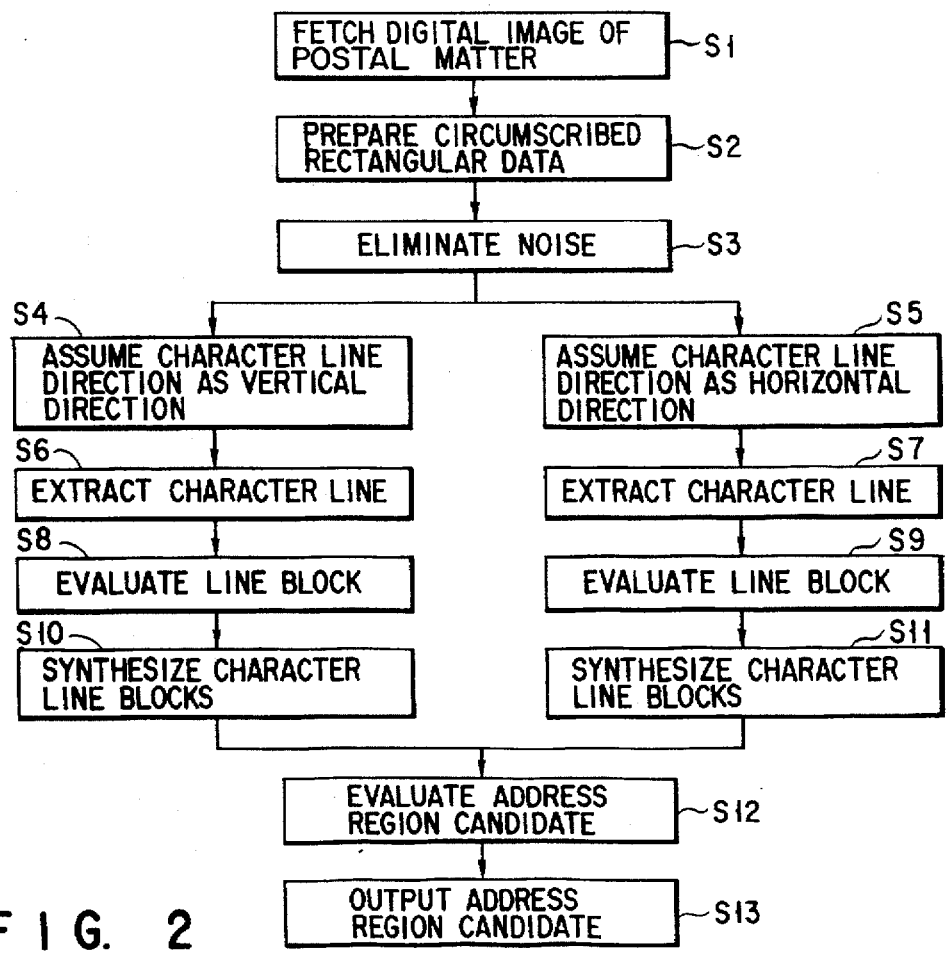
FIG. 2 is a flow chart illustrating the processing operations of an address region detecting unit.

FIG. 2 is a flow chart illustrating the process performed in the address region detection unit 303. The processing operations of the address region detection unit 303 will now be described with reference to this flow chart. At first, the image of postal matter 301 input by the image input unit 302 is subjected to a digitizing process (S1). Pixel regions connected on the digital image are found and a rectangular region circumscribed on these regions is found (S2). Then, the shape, position, etc. of each found rectangular region are determined on the basis of initially prepared determination reference data, and unnecessary rectangular data (noise) is eliminated (S3).

Regarding the rectangular data remaining after step S3, vertical and horizontal directions of lines of characters on the postal matter 301 are assumed (S4, S5). In each direction, the rectangular data is independently subjected to character line extraction (S6, S7), character line block evaluation (S8, S9), and a process of synthesizing character line blocks and detecting an address region candidate (S10, S11). The address region candidate detected in the process of steps S10 and S11 is evaluated on the basis of initially prepared determination reference data (S12). The address region candidate is output from the one with a highest evaluation result (S13).

Figure 3:
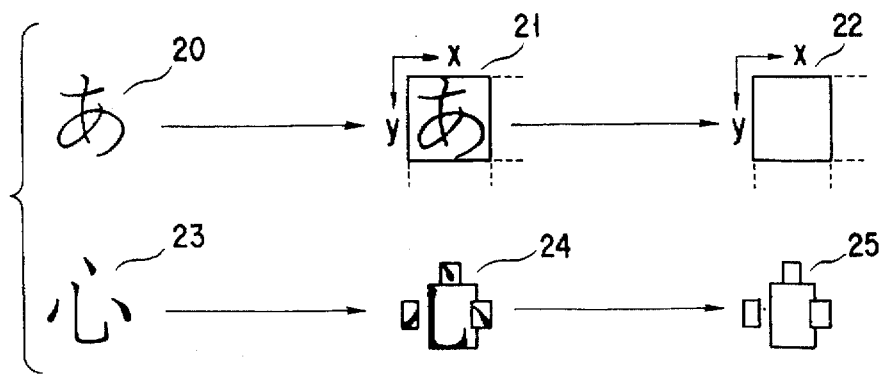
FIG. 3 illustrates a circumscribed rectangular data forming process.

The circumscribed rectangular data preparing process performed in step S2 in FIG. 2 will now be described with reference to FIG. 3. If a region 20 of an aggregation of pixels is detected from a digital image of postal matter, the maximum and minimum coordinate values of the region 20 in the x- and y-directions are found (21), and a rectangular region circumscribed about the aggregation of pixels is found (22). When attempting to detect a connection of pixels, if one character 23 is detected as discontinuous parts, the maximum and minimum coordinate values of each part in the x- and y-directions of a region 24 are found.

Figure 4:
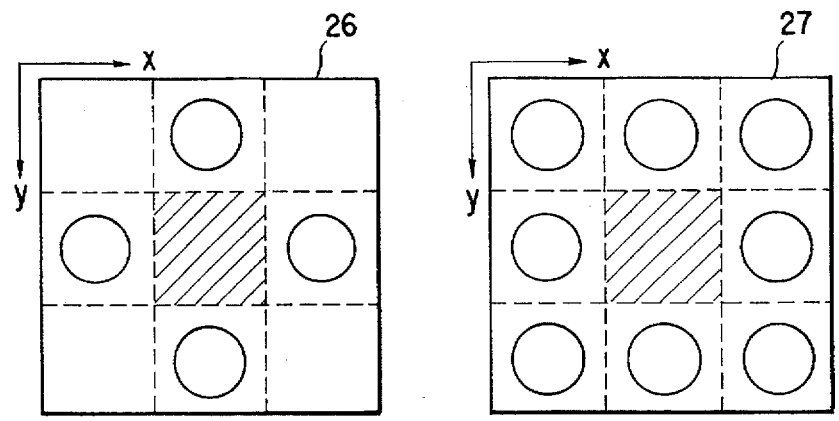
FIG. 4 illustrates circumscribed rectangular data forming processes.

FIG. 4 shows methods of extracting pixel connection components. In a 4-proximity method (26), if there are pixels adjoining a pixel-of-interest (the shaded region in the center of 26) in the x- and y-directions, the pixels are determined to be connected with the pixel-of-interest and synthesized. In an 8-proximity method (27), pixels adjoining a pixel-of-interest (the shaded region in the center of 27) in four diagonal directions, in addition to the pixels of the 4-proximity, method are synthesized.

Figure 5:
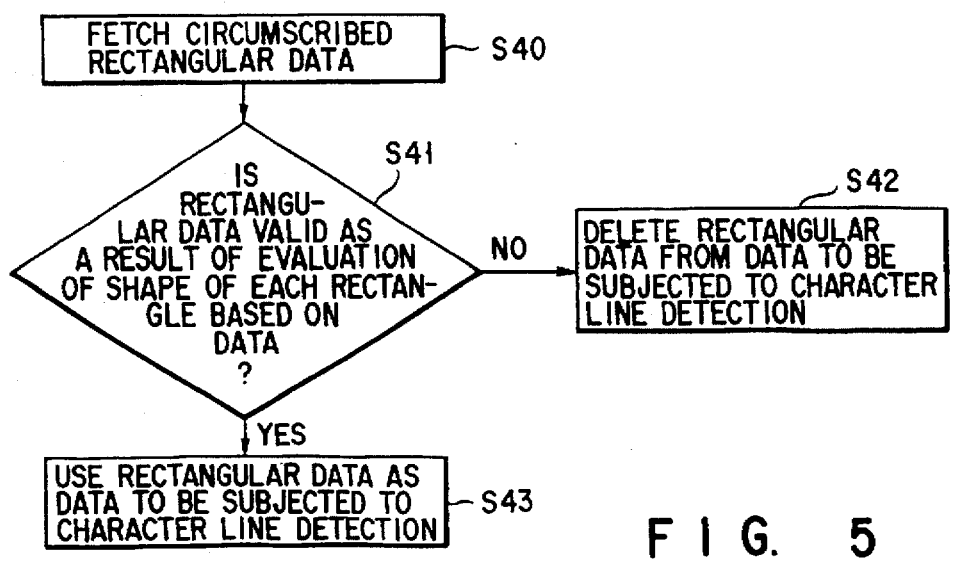
FIG. 5 is a flow chart illustrating a processing operation of a noise elimination unit.

The noise elimination process performed in step S3 in FIG. 2 will now be described with reference to the flow chart of FIG. 5. At first, circumscribed rectangular data formed in step S2 in FIG. 2 is fetched in (S40). Then, based on initially prepared determination reference data, the shape of each rectangular data unit is determined and it is determined whether or not each rectangular data unit is a data unit for character line detection (S41). Invalid rectangular data is excluded from the subsequent process (S42), and valid data is treated as data for character line detection processing (S43).

Figure 6:
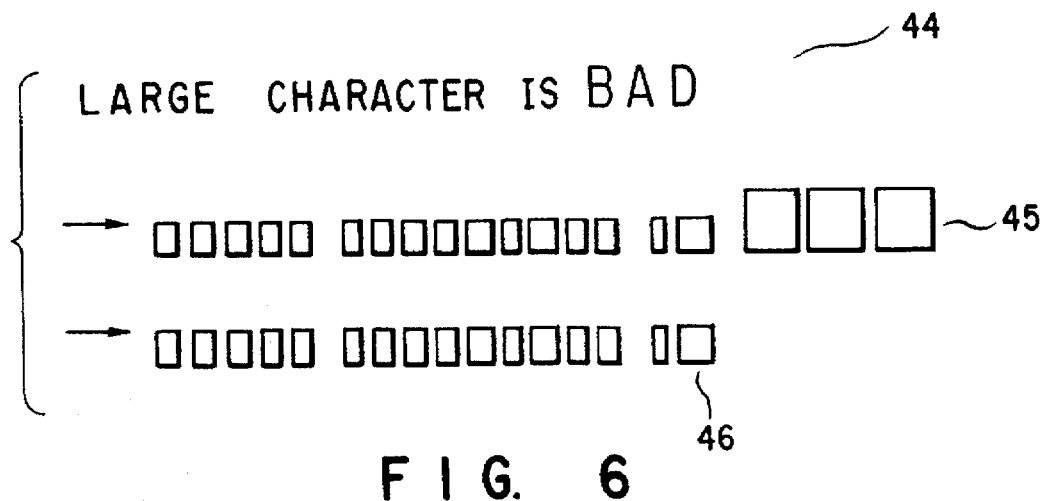
FIG. 6 illustrates the processing operation of the noise elimination unit.
Figure 7:
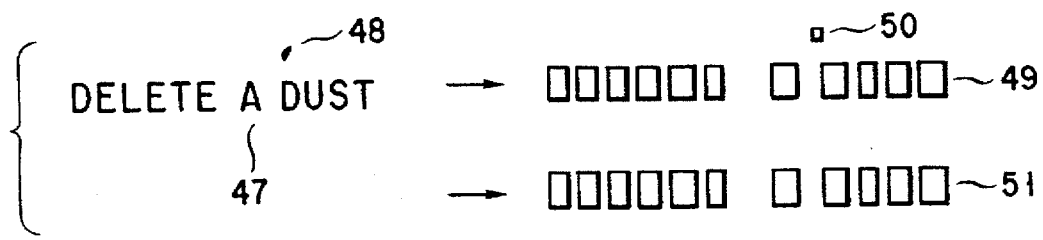
FIG. 7 illustrates the processing operation of the noise elimination unit.
Figure 8:
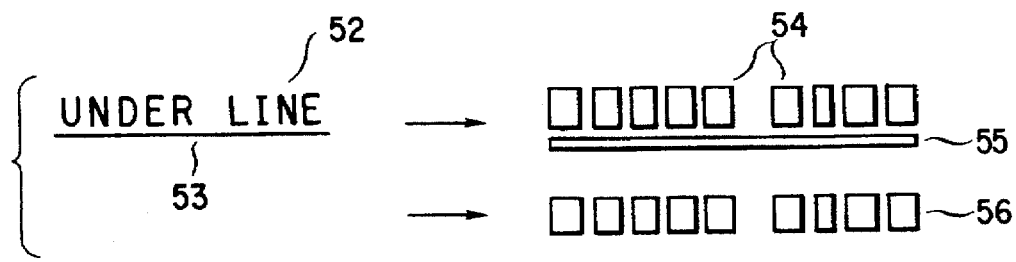
FIG. 8 illustrates the processing operation of the noise elimination unit.

FIGS. 6 to 8 show examples of the determination reference data.

Specifically, as shown in FIG. 6, when circumscribed rectangular data 45 is found from digital image 44 of a character, rectangular data with an area equal to or larger than a predetermined value is determined as data not to be subjected to character line detection processing and is removed (46).

As is shown in FIG. 7, when circumscribed rectangular data 49 is found from a digital image 47 including a stain 48 or the like, rectangular data 50 with an area equal to or less than a predetermined value is determined as data not to be subjected to character line detection processing and is removed (51).

As is shown in FIG. 8, when circumscribed rectangular data 55 and 56 is found from a digital image 52 including an underline 53, rectangular data 55 having a width of a predetermined value or less and a length of a predetermined value or more is determined as data not to be subjected to character line detection processing and is removed (51). In this context, the width of a rectangle refers to a shorter side thereof and the length of a rectangle refers to a longer side thereof.

Figure 9:
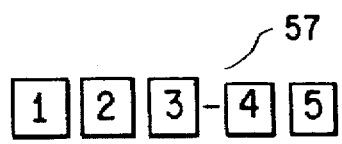
FIG. 9 illustrates the processing operation of the noise elimination unit.

Image data 57 of, e.g. a zip code, as shown in FIG. 9, is recognized as rectangular data having a prestored width and length. Thus, it is clear that the image data 57 representing a zip code is not an address region. Accordingly, the rectangular data is determined as data not to be subjected to character line detection processing. In this context, the width of a rectangle refers to a shorter side thereof and the length of a rectangle refers to a longer side thereof.

Figure 10:
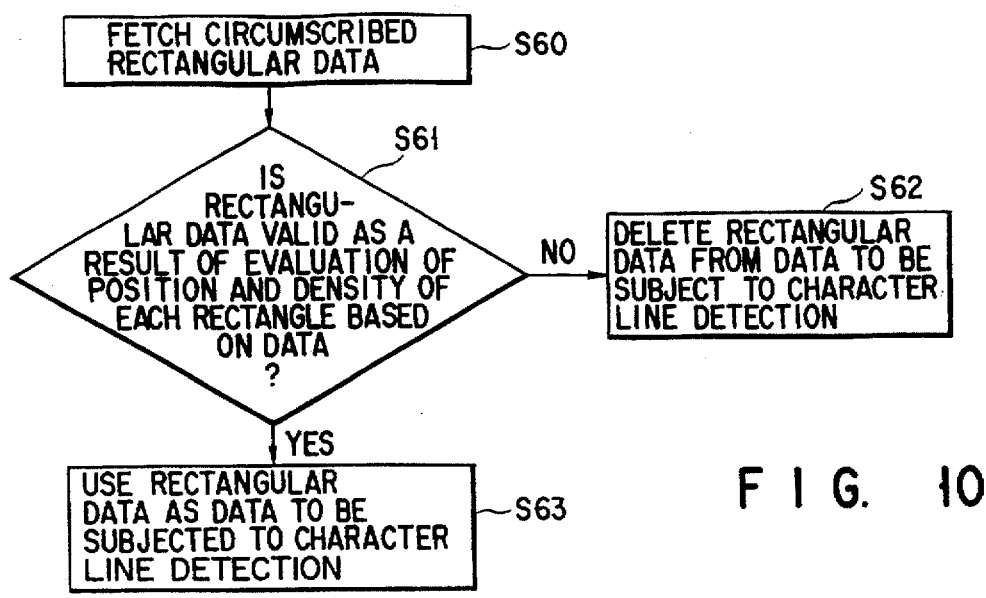
FIG. 10 is a flow chart illustrating another processing operation of the noise elimination unit.

FIG. 10 is a flow chart illustrating another example of the noise elimination process performed in step S3 in FIG. 2. At first, circumscribed rectangular data formed in step S2 in FIG. 2 is fetched in (S60). The position and density of each rectangular data unit are determined on the basis of initially prepared determination reference data and it is determined whether the rectangular data is data to be subjected to character line detection (S61). Invalid rectangular data is excluded from the subsequent process (S62), and valid data is used as data for character line detection processing (S63).

Figure 11:
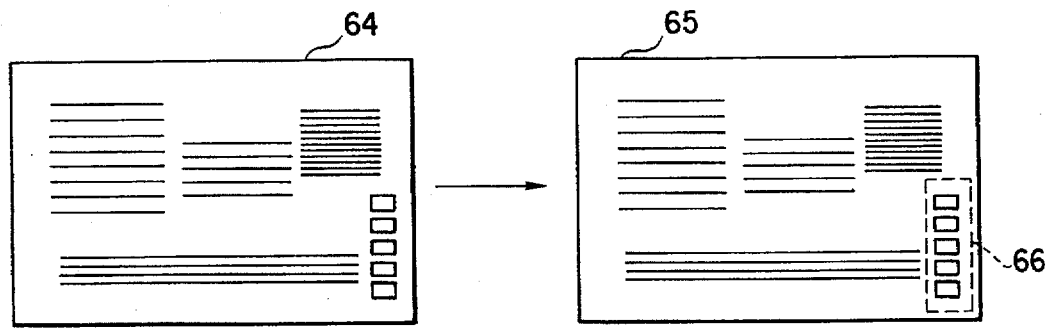
FIG. 11 illustrates said another processing operation of the noise elimination unit.

FIG. 11 shows an example of the determination reference data. If there are circumscribed rectangles 66 having preset width and length in a predetermined region of an image 64, 65, those rectangles are considered to have information of the kind registered in accordance with set values of width and length.

For example, in the case of postal matter, if there is a circumscribed rectangle group of a predetermined size in an upper specific region of the postal matter, the circumscribed rectangle group may be determined as a zip code region.

The character line extraction process in steps S4 to S7 in FIG. 2 will now be described with reference to FIG. 12. With respect to the circumscribed rectangular data 80 obtained by image processing, rectangular data units adjacent to one another in the x-direction are synthesized (81), thereby detecting (82) an x-directional character line. Independently of the x-directional character line detection process, the same circumscribed rectangular data units are synthesized in the y-direction (83). Thereby, the y-directional character line is detected (84).

Figure 13:
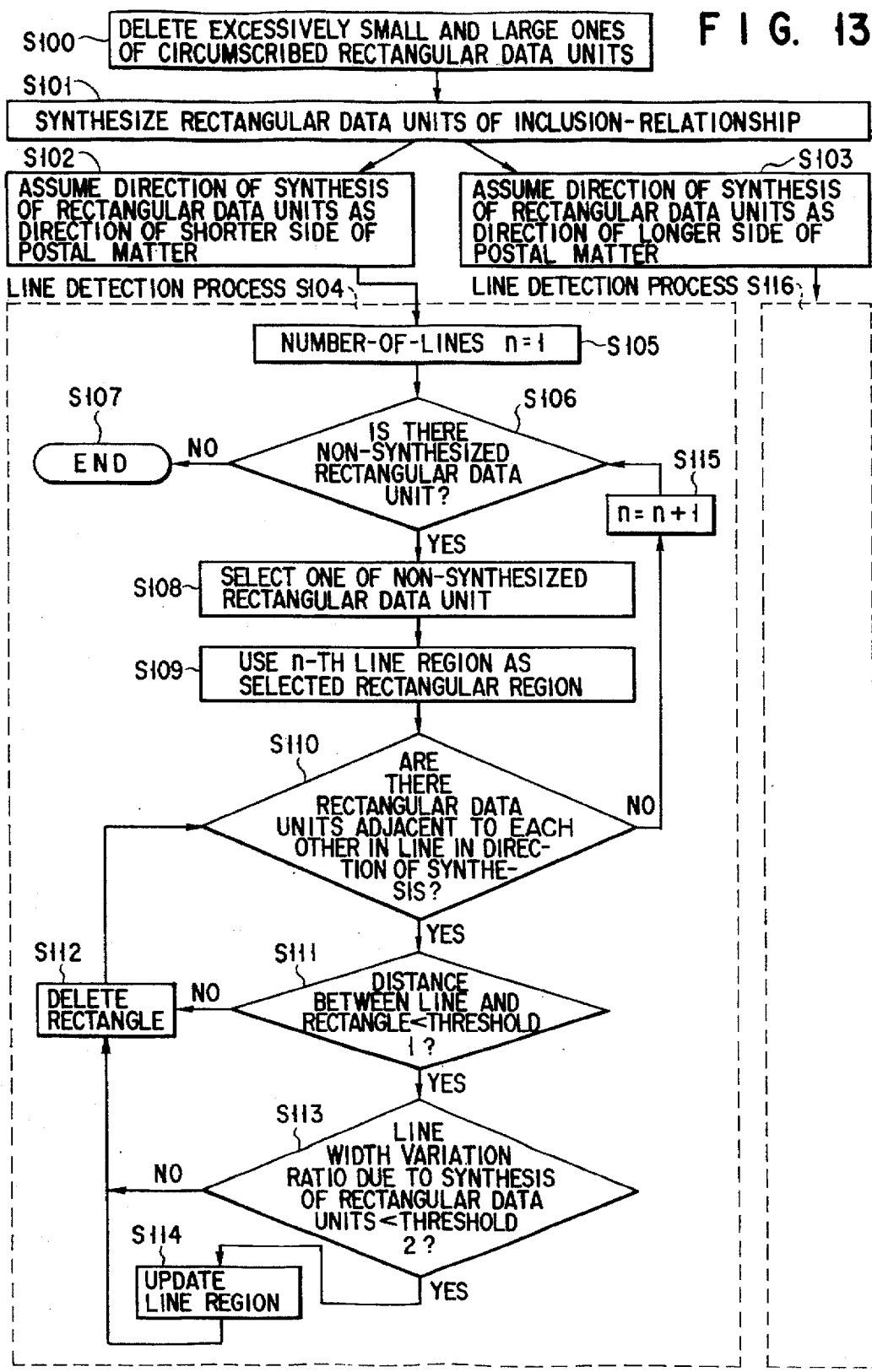
FIG. 13 is a flow chart illustrating an example of a method for synthesizing circumscribed rectangular data and detecting a character line.

FIG. 13 is a flow chart illustrating an example of a method of synthesizing rectangular data and detecting a character line. The processing operation of this method will now be described with reference to the flow chart. During preprocessing, excessively small and large circumscribed rectangular data units are eliminated (S100), and rectangular data units of the inclusion-relationship are synthesized and rearranged (S101). Then, the direction of synthesizing rectangular data units is determined (S102, S103) and the line detection process is initiated (S104).

In the line detection process in step S104, the number-of-lines n is set at "1" (S105). Then, it is determined whether there are rectangular data units which are not synthesized in any line (S106). If not, the process is completed (S107). If there are such rectangular data units, one of them is selected (S108) and the n-th line region is initialized to the rectangular region (S109).

Then, with respect to the present line region, it is checked whether or not there are rectangular data units adjacent to each other in the direction of synthesis (S110). If not, "n" is incremented (S115) and the control returns to S106. Otherwise, the distance between the selected rectangular data unit and line is found (S111). If the distance exceeds a set value, the rectangular data unit is deleted from the list of all rectangular regions (S112) and the control returns to S110.

If the distance is less than a set value, a ratio of line width variation is checked before and after the rectangular data unit selected in S110 is synthesized into the line region (S113). If the ratio of line width variation exceeds a predetermined value, the rectangular data unit is deleted from the list and the control returns to S110. Otherwise, the rectangular data unit selected in S110 is synthesized and the line region is changed (S114). The rectangular data unit is deleted from the list and the control returns to S110.

In the above line detection process, simultaneously with the vertical detection process, the horizontal detection process is performed independently on the basis of the same rectangular data (S116).

Figure 14:
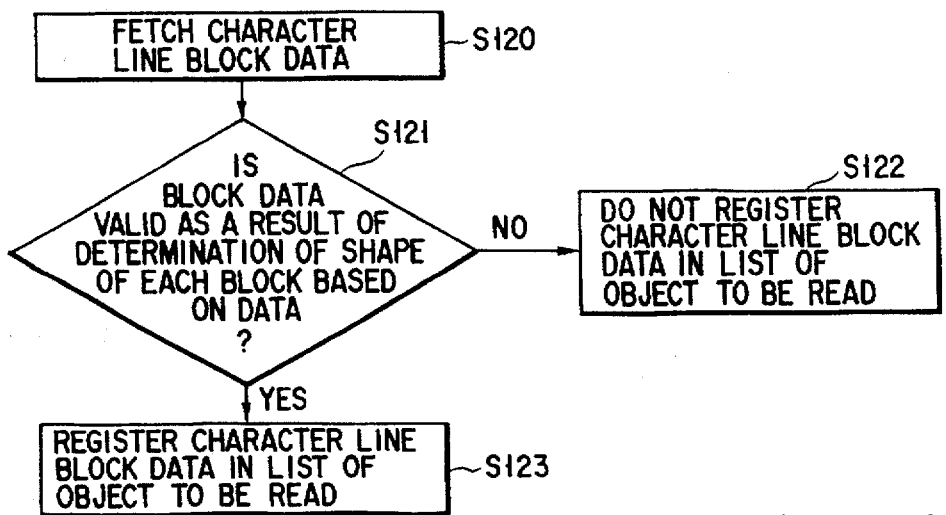
FIG. 14 is a flow chart illustrating a process for evaluating an extracted character line.

The extracted character line evaluation process performed in S8 and S9 in FIG. 2 will now be described with reference to the flow chart of FIG. 14. At first, extracted character line data is fetched in (S120). Then, with respect to the shape of each character line data unit, it is determined whether or not the character line data is address indication object data based on initially prepared determination reference data (S121). Invalid character line data is excluded from the subsequent process (S122) and valid character line data is used as address indication object data (S123).

FIGS. 15 to 17 show an example of the determination.

As is shown in FIG. 15, a block 124 having a width of a predetermined value or more among obtained character line blocks is determined to be a data unit not to be subjected to address indication and deleted (125).

As is shown in FIG. 16, a block 126 having a width of a predetermined value or less among obtained character line blocks is determined to be a data unit not to be subjected to address indication and deleted (127).

As is shown in FIG. 17, a block 128 having a ratio of length and width outside a predetermined range among obtained character line blocks is determined to be a data unit not to be subjected to address indication and is deleted (129).

Figure 18:
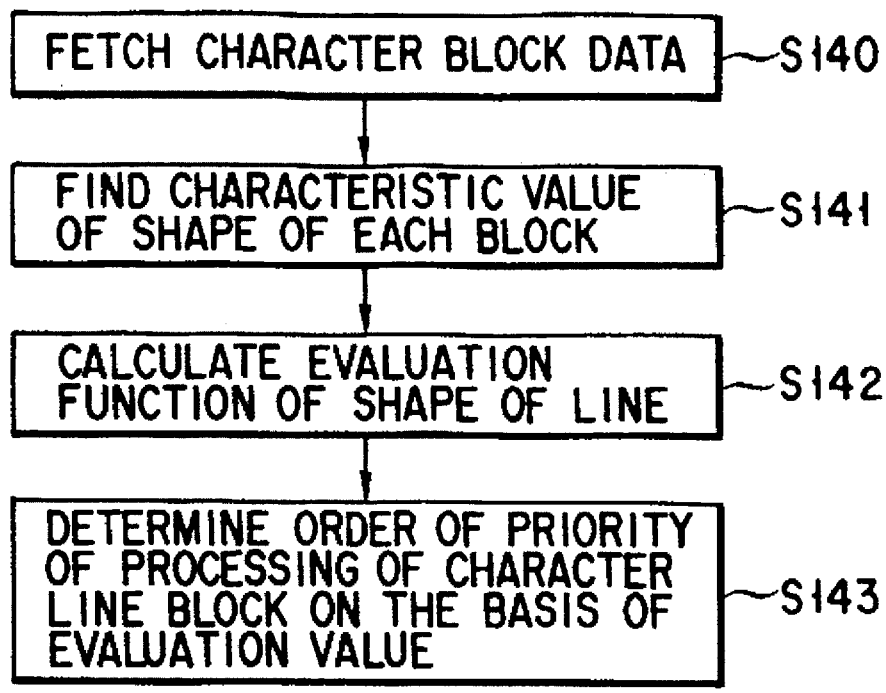
FIG. 18 is a flow chart illustrating another process for evaluating an extracted character line.

FIG. 18 is a flow chart showing an example of another process of evaluating an extracted character line performed in steps S8 and S9 in FIG. 2. At first, extracted character line data is fetched (S140), and a characteristic value of the shape of each character line data unit is found (S141). Thereafter, a calculation based on the shape of each character line data unit is performed with an initially prepared evaluation function (S142), and an evaluation value for determining the order of priority of processing the character line data as address indication object data is calculated (S143).

The evaluation function of the character line data will now be additionally described. The evaluation function is used to evaluate the width of the character line block and the number of characters of the character line block.

Regarding the width of the character line, it is evaluated, for example, (1) whether the width of the character line is within a range of set values and (2) whether the ratio of the width of the character line to an average value of the width of the circumscribed rectangular data included in the character line is a predetermined value or less. The closer the character line block matches the evaluation items, the higher the evaluation value thereof. In this context, the width of the character line refers to the dimension of the character line in a direction perpendicular to the direction of the line, and the width of the circumscribed rectangular data refers to the dimension of the circumscribed rectangular data in a direction perpendicular to the direction of the line.

Regarding the number of characters of the character line block, it is evaluated, for example, (1) whether the number of characters in the character line is within a range of set values and (2) whether or not the ratio of the number of circumscribed rectangular data units included in the character line to the number of characters in the character line is a predetermined value or less. The closer the character line block matches the evaluation items, the higher the evaluation value thereof. In this context, the number of characters in the character line refers to a value obtained by dividing the length of the character line by the width of the character line, or a value obtained by dividing the length of the character line by an average value of the widths of circumscribed rectangular data units included in the character line. The length of the character line refers to the dimension of the character line in the direction of the line.

The process of synthesizing character line blocks and deleting the character statement region in steps S10 and S11 in FIG. 2 will now be described with reference to FIGS. 19 and 20.

As is shown in FIG. 19, with respect to x-directional character line block data 160 extracted by synthesizing circumscribed rectangular data units in the x-direction, the character line blocks adjacent in the y-direction and the character line blocks aligned in the x-direction are synthesized to obtain synthesis data 161. Based on the synthesis data 161, data 162 having x-directional character statement regions (in broken lines) are specified.

Figure 20:
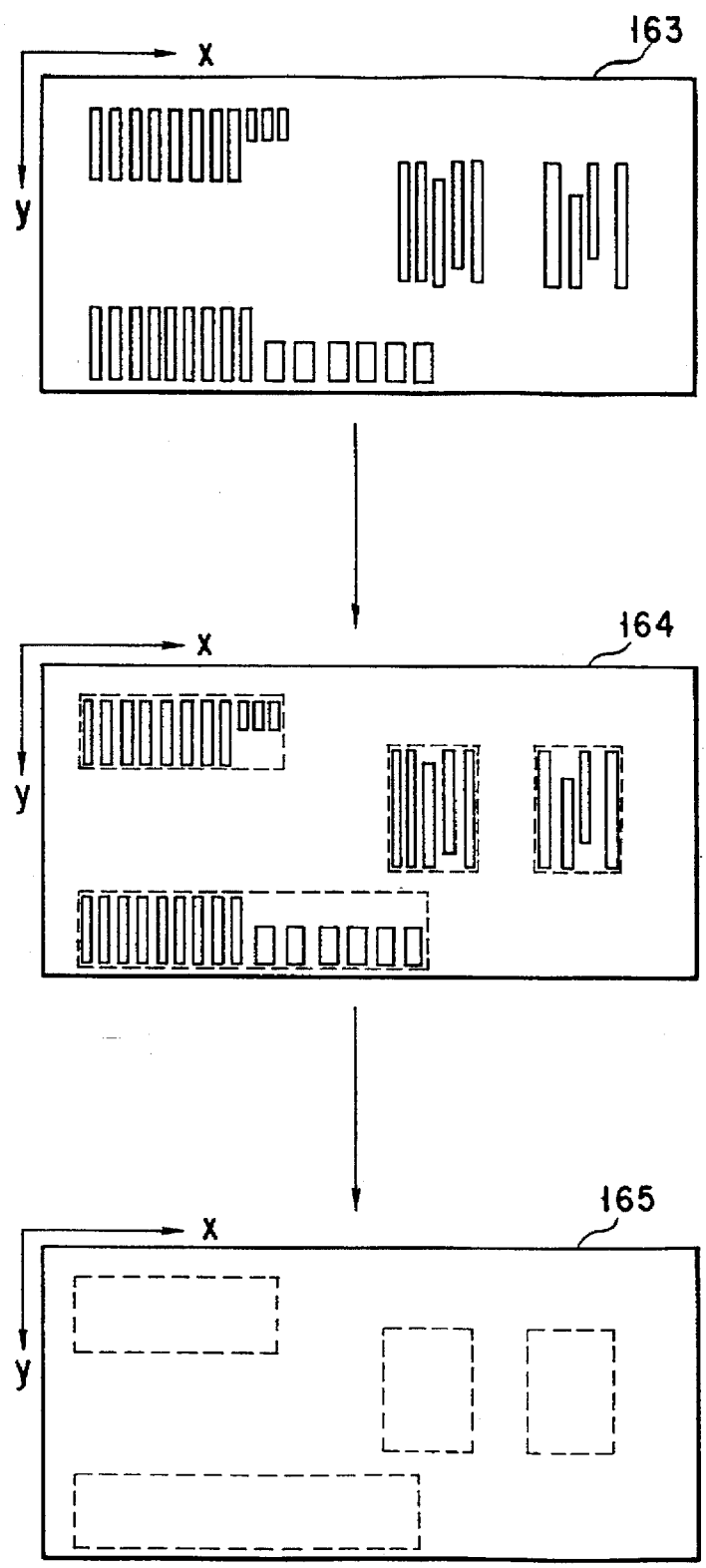
FIG. 20 illustrates a process for synthesizing character line blocks and detecting a character statement region.

Similarly, as shown in FIG. 20, with respect to y-directional character line block data 163 extracted by synthesizing circumscribed rectangular data units in the y-direction, the character line blocks adjacent in the x-direction and the character line blocks aligned in the y-direction are synthesized to obtain synthesis data 164. Based on the synthesis data 164, data 165 having y-directional character statement regions (in broken lines) are specified is obtained.

Figure 21:
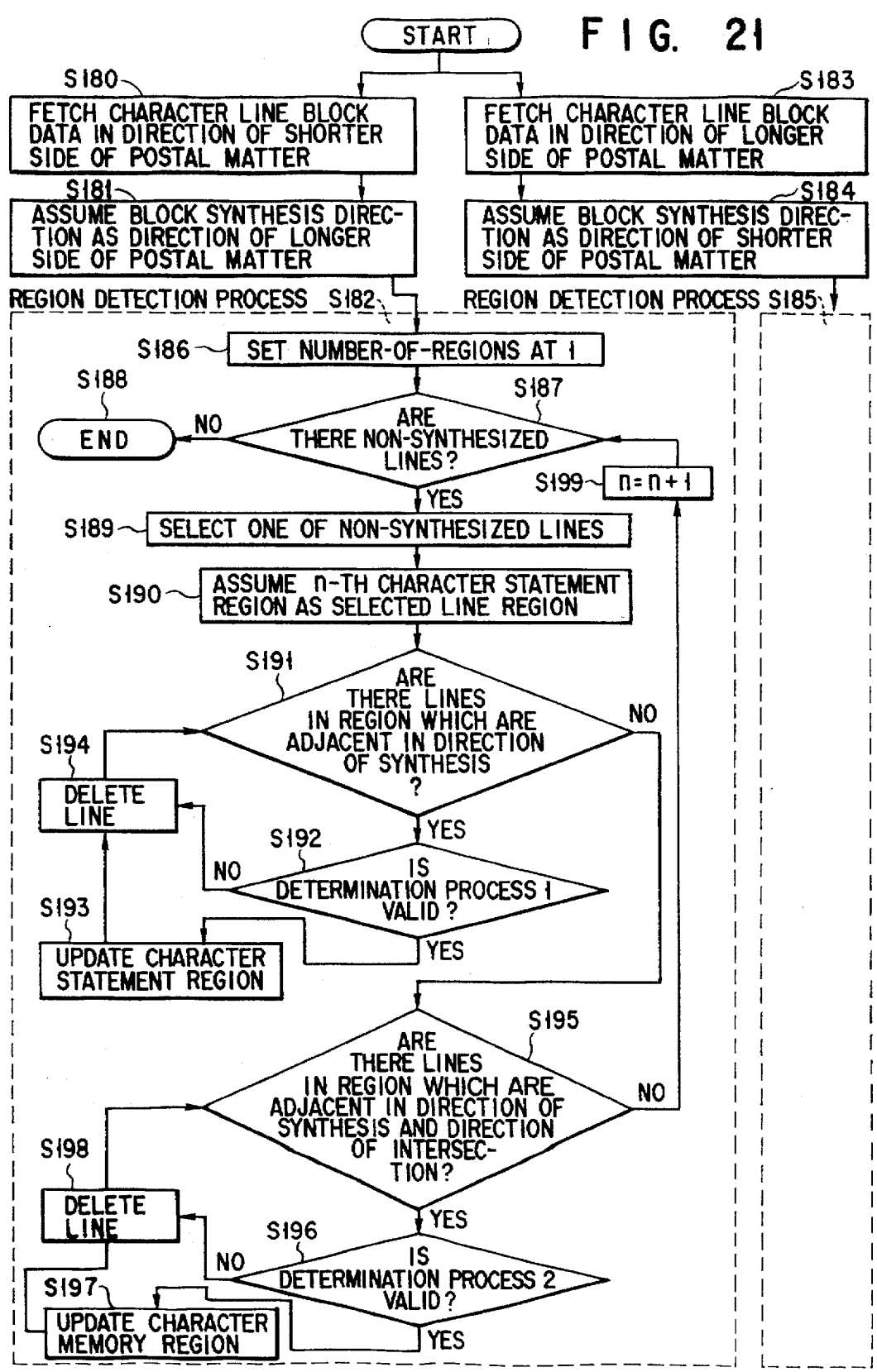
FIG. 21 is a flow chart illustrating an example of a method of synthesizing character line blocks and detecting a character statement region.

FIG. 21 is a flow chart showing a method of synthesizing the character line blocks and detecting the character statement region. The processing operations in this method will now be described with reference to this flow chart. At first, line data in the direction of the shorter side of postal matter is fetched (S180). The direction of synthesis is set to the direction of the longer side of the postal matter (S181), and the region detecting process is performed (S182). Simultaneously, line data in the direction of the longer side of the postal matter is fetched (S183). The direction of synthesis is set to the direction of the shorter side of the postal matter (S184) and the region detecting process is performed (S185).

In the region detecting process in step S182, S185, the number n of character statement regions is set at "1" (S186). Then, it is determined whether there are lines which are not synthesized in any region (S187). If not, the process is completed (S188). If there are such lines, one of them is selected (S189), and the n-th character statement region is initialized to the associated line region (S190).

Subsequently, it is checked whether there is a line adjacent to the present line region in the direction of synthesis (S191). If there is such a line, the line is determined with use of initially prepared determination reference data (S192). If the line is determined to be valid, the line is synthesized in the region and the region is updated (S193). The line is deleted from the list (S194) and the control returns to S191. If the line is determined to be invalid, the line is deleted from the list (S194) and the control returns to S191.

In S191, if there is no such line, it is checked whether there is a line adjacent to the present region in a direction perpendicular to the direction of synthesis (S195). If there is such a line, the line is determined with use of initially prepared determination reference data (S196). If the line is determined to be valid, the line is synthesized in the region and the region is updated (S197). The line is deleted from the list (S198) and the control returns to S195. If the line is determined to be invalid, the line is deleted from the list (S198) and the control returns to S195.

In step S195, if there is no such line, n is incremented by one (S199) and the control returns to step S187.

Figure 22A:
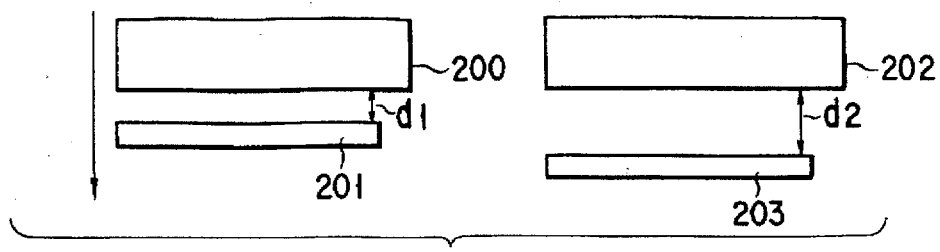
FIGS. 22A and 22B illustrate an example of a determination process performed in the method as illustrated in FIG. 21.
Figure 22B:
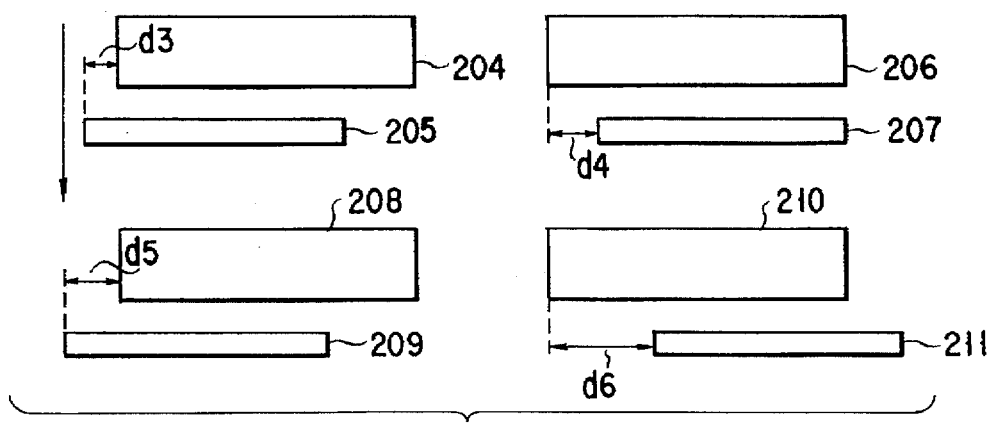

FIGS. 22A and 22B show an example of the determination process performed in step S192 in FIG. 21. In this example, as shown in FIG. 22A, if the distance d1 between two regions 200 and 201 in the direction of synthesis, the vertical direction, is a predetermined threshold or less, the synthesis is performed. if the distance d2 between two regions 202 and 203 in the direction of synthesis is a predetermined threshold or more, the synthesis is not performed. In one example, d1=2 mm, d2=10 mm, and threshold set value=about 8 mm.

If the displacement d3 between regions 204 and 205 in a direction perpendicular to the direction of synthesis, the horizontal direction, or the displacement d4 between regions 206 and 207 in a direction perpendicular to the direction of synthesis is a predetermined threshold or less, as shown in FIG. 22B, the synthesis is performed. However, if the displacement d5 between regions 208 and 209 in a direction perpendicular to the direction of synthesis or the displacement d6 between regions 210 and 211 in a direction perpendicular to the direction of synthesis is a predetermined threshold or more, the synthesis is not performed. In one example, d3=5 mm, d4=25 mm, d5=10 mm, d6=30 mm, and threshold set value=about 20 mm.

Figure 23:
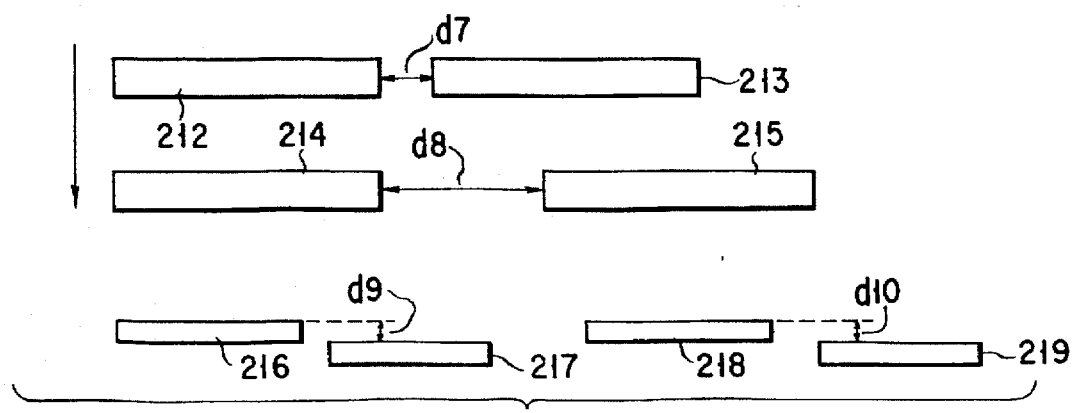
FIG. 23 illustrates another example of the determination process performed in the method as illustrated in FIG. 21.

FIG. 23 shows an example of the determination process performed in step S196 in FIG. 21. In this example, as shown in FIG. 23, if the displacement d7 between regions 212 and 213 in a direction perpendicular to the direction of synthesis, the horizontal direction, is a predetermined threshold or less, the synthesis is performed. If the displacement d8 between regions 214 and 215 in a direction perpendicular to the direction of synthesis is a predetermined threshold or more, the synthesis is not performed. In one example, d7=10 mm, d8=40 mm, and threshold set value= about 20 mm.

In another case, if the displacement d9 between regions 216 and 217 in the direction of synthesis, the vertical direction, is a predetermined threshold or less, the synthesis is performed. If the displacement d10 between regions 218 and 219 in the direction of synthesis is a predetermined threshold or more, the synthesis is not performed. In one example, d9=2 mm, d10=5 mm, and threshold set value= about 4 mm. The threshold value is set at a fixed value or a value calculated from a line size.

The process for evaluating the extracted character statement region performed in step S12 in FIG. 2 will now be described with reference to the flow chart of FIG. 24. Extracted character statement region data is fetched (S220). With respect to the region data, a characteristic value relating to the shape of each region is found (S221). Thereafter, a preset evaluation function relating to the shape and the number of lines in each region is calculated (S222). Furthermore, based on the arithmetic operation result of the evaluation function, it is found that target information is stated and an evaluation value for determining the order of priority of processing is obtained (S224).

The evaluation function will now be additionally described with reference to FIGS. 25A1–25A2 and 25B1–25B2. As regards the shape and the number of lines of the region, it is determined (1) whether or not the ratio of |xl/|yl of regions 225 and 226 is within a predetermined range of set values, as shown in FIG. 25A. If the ratio is outside the range, the evaluation value decreases. In addition, it is determined (2) whether or not the number of lines included in the region is within a predetermined range of set values, as shown in FIG. 25B1–25B2. If not, the evaluation value is set at a low value. In other words, the better the region matches the conditions of items, the higher the evaluation value given to the region. The ratio of |xl/|yl and the range of set values of the number of lines in the region are calculated, respectively, in the case where the line direction is the x-direction and in the case where the line direction is the y-direction.

As regards the position of the region, as shown in FIG. 26, priority evaluation is performed on the basis of the distance d between the center P of postal matter and each region candidate 241, as a standard for selecting the region candidate.

In FIG. 27, priority evaluation is performed on the basis of the distance d between the center P of an upper edge portion of postal matter and each region candidate 243, as a standard for selecting the region candidate.

In FIG. 28, priority evaluation is performed on the basis of the distance d between the zip code region P of postal matter and each region candidate 245, as a standard for selecting the region candidate.

In FIG. 29, priority evaluation is performed on the basis of the distance d between the postage area P of postal matter and each region candidate 247, as a standard for selecting the region candidate.

Reference points used in evaluating the positions of regions are given, as shown in FIGS. 30, 31A and 31B.

In FIG. 30, with respect to both x-directional 262 and y-directional 261 regions, evaluation is performed on the basis of the distance d from a common reference point P to the x-directional or y-directional region.

In FIG. 31A, with respect to an x-directional region 263, evaluation is performed on the basis of reference point P for x-directional evaluation. In FIG. 31B, with respect to a y-directional region 265, evaluation is performed on the basis of the distance d from reference point P for y-directional evaluation. By these evaluations, n-candidates with high evaluation values are selected.

Examples of methods of selecting n-candidates are (1) n-candidates are selected from all x-directional and y-directional regions from ones with high evaluation values, and (2) m-candidates and (n-m)-candidates are selected from x-directional and y-directional regions.

The process of generally evaluating address region candidates and outputting upper n-candidates with higher evaluation values will now be described with reference to the flow chart of FIG. 32. At first, character line data included in n-regions selected in the preceding step is fetched (S280). Next, the positional relationship between each a line and other lines located in the region to which the line belongs is determined by an initially prepared function (S281). Specifically, an evaluation value relating to a positional relationship with other lines is found (S282), an evaluation result relating to the shape of the line is found (S283), an evaluation result of the region to which the line belongs is obtained (S284), and the evaluation results are totally evaluated (S285). Thus, the upper N-candidates with the highest general evaluation are output (S286). With respect to the address candidate region having the highest evaluation result, character recognition processing is performed (S287). With respect to the address candidate region, if correct address information is confirmed (S288), the process is completed. If not, character recognition is performed with respect to the region candidate with the second highest evaluation (S289). If correct address information is not confirmed once again, the recognition of the next candidate region is performed. In this manner, the regions are subjected to character recognition in the order of evaluation values. Thereby, the frequency of character recognition in useless regions decreases, and the character recognition process can be performed more efficiently than in the prior art.

Figure 33B:
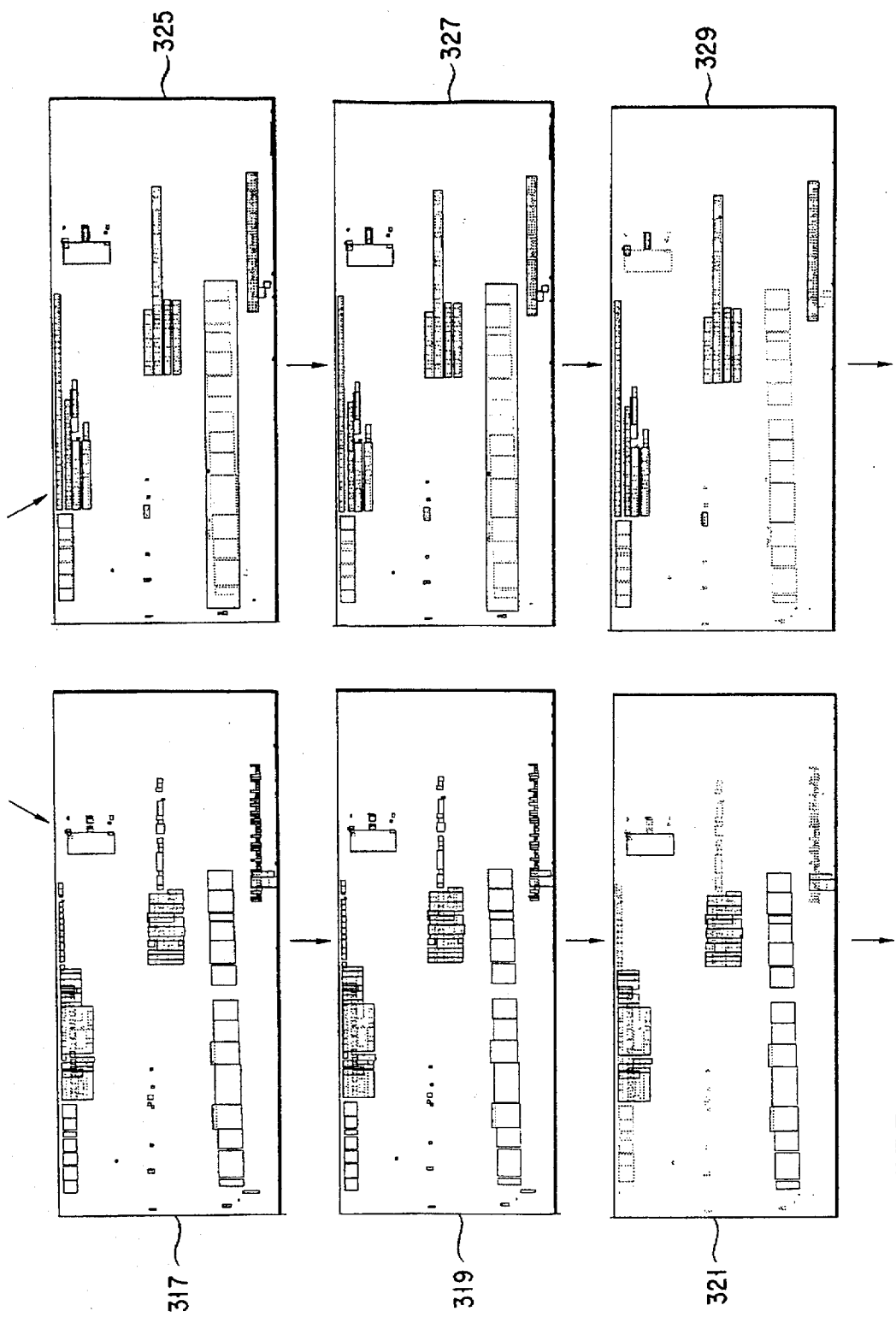
Figure 33C:
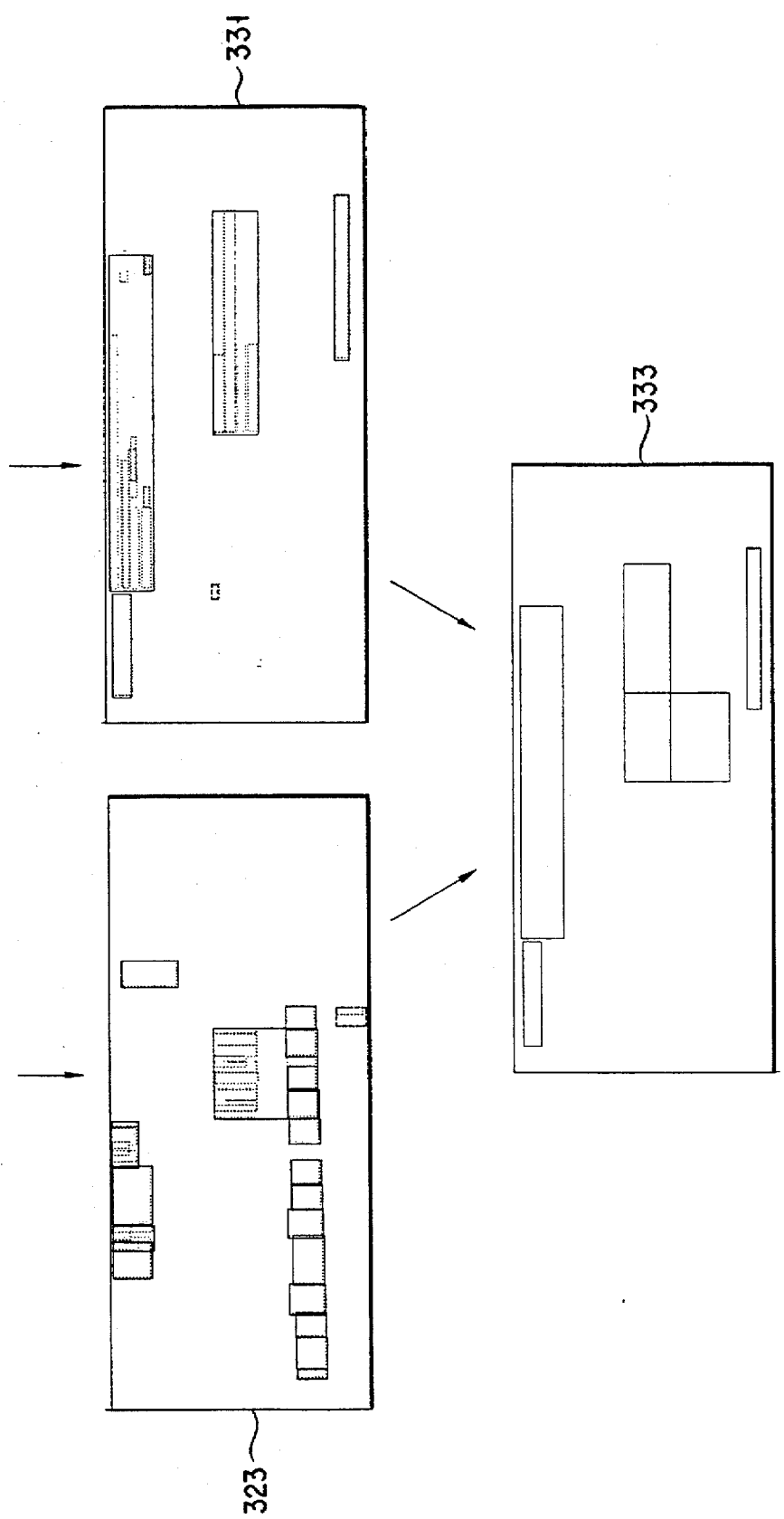
Figure 34:
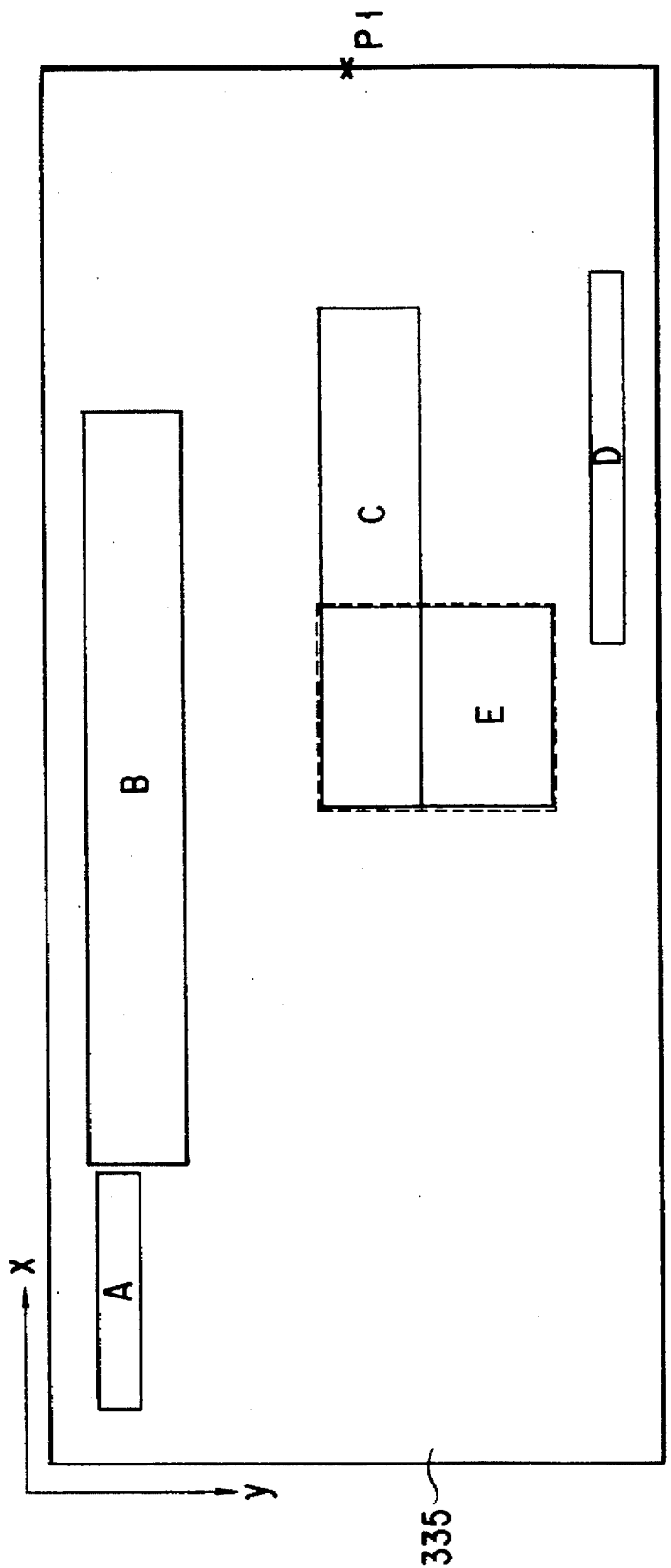
FIG. 34 shows an example of postal matter subjected to evaluation of the position of the region.

FIGS. 33A, 33B and 33C are views for illustrating the steps of the address region detection process in the present invention. FIG. 34 shows an example of postal matter subjected to evaluation of the position of region. FIG. 35 is a table showing values of an evaluation function relating to the position of the address region. FIG. 36A is a table showing values of an evaluation function relating to the shape of the address region in the X-direction. FIG. 36B is a table showing values of an evaluation function relating to the shape of the address region in the Y-direction. FIG. 37 is a table showing values of an evaluation function relating to the number of lines in the address region, and FIG. 38 is a table relating to the evaluation of each address region of postal matter in FIG. 34.

FIGS. 33A, 33B and 33C show examples of the postal matter processed in the address region detection process of the present invention, and the image data processing based on the postal matter. The steps of the image data process are shown specifically in accordance with the flow chart of FIG. 2.

Postal matter 301 is fetched as a digital image 311 by the image input unit 302 (S1). The digital image 311 is converted to rectangular image data 313 (S2). Further, as shown in FIG. 7, the image data is converted to an image 315 from which fine noise images are removed (S3).

Furthermore, the image 315 is processed assuming the direction of characters is vertical (317, 319, 321, 323) and processed assuming the direction of characters is horizontal (325, 327, 329, 331). The above-mentioned horizontal and vertical processing is performed in parallel.

The image 317, the direction of characters of which is assumed to be vertical, is converted to an image 319 in which the character line is extracted. A line block is evaluated by a method, etc. as illustrated in FIGS. 15 to 17, and converted to an image 321 in which a portion unmatched with the address region is removed. Finally, the image 321 is converted to a synthesis image 323 (S4, S6, S8, S10).

In the case of the image 315 the direction of characters of which is assumed to be horizontal, the image 315 is similarly converted to images 325, 327, 329 and 331 successively (S5, S7, S9, S11).

The two images 323 and 331 are integrated into an image 333 in which chosen address region candidates are included. Evaluation functions on these address region candidates are calculated (S12) and output along with ranks (S13).

FIG. 34 shows postal matter 335 in which address region candidates A to E are stated. As regards the address region candidates A to E, evaluation functions, as mentioned below, are calculated and finally ranks of certainty are determined.

FIG. 35 is a table showing values of an evaluation function relating to the position of the address region. Evaluation points from 50 to 100 are given in accordance with the magnitude 1 [cm] between reference point P1 to the address region candidate. If the distance 1 is 20 cm or more, at least 50 points are given. When the distance 1 is 4 to 10 cm, the highest evaluation point of 100 is given since it is considered to be the value of the most normal position of the address region.

FIG. 36A is a table showing values of an evaluation function relating to the shape of the address region in the X-direction, and FIG. 36B is a stable showing values of an evaluation function relating to the shape of the address region in the Y-direction. By these functions, the shape of the address region can be evaluated.

Specifically, when x-directional processing is performed, the evaluation value of |x|/|y|=r is the lowest point of −50 when 0<r<1. If 2<r≦10, the value is the highest point of 10 and is considered to be the value most closely associated with the most normal address region. On the other hand, when y-directional processing is performed, the value of |y|/|x|=r is the lowest point of −50 when 0<r≦1. If 2<r≦10, the value is the highest point of 10 and is considered to the value most closely associated with the most normal address region.

FIG. 37 is a table showing values of an evaluation function relating to the number of lines in the address region. If the number-of-lines n of the address region is 10 or more, the evaluation value is the lowest, −40. If n is between 3 and 5, the evaluation value is the highest, 0.

Thus, the values of the evaluation functions relating to the three factors are summed, and the address region candidates are ranked. FIG. 38 is a table relating to the evaluation of each address region of the postal matter as shown in FIG. 34. As a result, region A is ranked "4" with 45 points, region B is ranked "2" with 80 points, region C is ranked "1" with 110 points, region D is ranked "3" with 75 points, and region E is ranked "5" with 40 points. The probability of each address region candidate is expressed in numerals, and the address region candidates are arranged in order. Thus, character recognition can be performed for the address region candidates with higher ranks. Thereby, the character recognition can be performed more efficiently than in the prior art and the total time needed for recognition can be decreased.

As has been described above, according to the above embodiment, the circumscribed rectangular data is used in calculating the address statement region of the postal matter. Thereby, the data amount can be reduced and efficient processing can be achieved.

Since the address indication object data is determined by using the shape and position data of the circumscribed rectangular data, the address region data to be recognized can be selected exactly and efficiently from the postal matter including advertisement, a postage stamp and/or an underline, in addition to the address information.

As to the direction of character lines, both vertical and horizontal circumscribed rectangular data units are generally determined. As compared to the case where an address region is detected in a predetermined single direction of character line, the address line detection precision can be enhanced.

Furthermore, a plurality of address region candidates with the highest rankings are selected. Thus, image processing ambiguity can be eliminated in character recognition and word recognition. As compared to the case where only a single candidate is selected, the possibility of erroneous detection of the address region can be decreased.

As has been described above in detail, the present invention can provide an address region detection apparatus capable of detecting an address region on postal matter quickly and exactly.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An address region detection apparatus comprising:

converting means for converting an image having address information on postal matter to a digital image signal formed of a digital electronic signal;

finding means for finding a pixel region associated with the digital image signal in accordance with the digital image signal;

first synthesizing means for synthesizing the pixel region in a direction of a character line so as to form a plurality of character line rectangular regions; and second synthesizing means for synthesizing the plurality of character line rectangular regions in a direction perpendicular to the character line, thereby detecting an address region including the address information.

2. The address region detection apparatus according to claim 1, wherein the second synthesizing means includes:

distance measuring means for synthesizing the plurality of character line rectangular regions only when a distance between each of two adjacent ones of the plurality of character line rectangular regions in a direction of synthesis of the second synthesizing means is smaller than a set value.

3. The address region detection apparatus according to claim 1, wherein the second synthesizing means includes:

distance measuring means for synthesizing the plurality of character line rectangular regions only when a distance between each of two adjacent ones of the plurality of character line rectangular regions in a direction perpendicular to a direction of synthesis of the second synthesizing means is smaller than a set value.

4. The address region detection apparatus according to claim 1, wherein the second synthesizing means includes:

beginning distance measuring means for synthesizing the plurality of character line rectangular regions only when a distance between beginning positions of each of two adjacent ones of the plurality or character line rectangular regions in a direction of synthesis of the second synthesizing means is smaller than a set value.

5. The address region detection apparatus according to claim 1, wherein the second synthesizing means includes:

beginning distance means for synthesizing the plurality of character line rectangular regions only when a distance between beginning positions of each of two adjacent ones of the plurality of character line rectangular regions in a direction perpendicular to a direction of synthesis of the second synthesizing means is smaller than a set value.

6. The address region detection apparatus according to claim 1, wherein the direction of the character line is horizontal.

7. The address region detection apparatus according to claim 1, wherein the direction of the character line is vertical.

8. The address region detection apparatus comprising:

converting means for converting an image having address information on postal matter to a digital image signal formed of a digital electronic signal;

finding means for finding a pixel region associated with the digital image signal in accordance with the digital image signal;

first synthesizing means for synthesizing the pixel region in a first direction so as to form a plurality of first rectangular regions;

second synthesizing means for synthesizing the plurality of first rectangular regions in a second direction perpendicular to the first direction so as to form a second rectangular region;

third synthesizing means for synthesizing the pixel region in the second direction so as to form a plurality of third rectangular regions;

fourth synthesizing means for synthesizing the plurality of third rectangular regions in the first direction so as to form a fourth rectangular region; and address region detecting means for detecting an address region including the address information by evaluating the second rectangular region and the fourth rectangular region.

9. The address region detection apparatus according to claim 8, wherein the address region detecting means includes:

evaluating means for evaluating the second rectangular region and the fourth rectangular region in accordance with predetermined data so as to form an address region.

10. The address region detection apparatus according to claim 8, wherein the finding means includes:

deleting means for deleting the pixel region greater than a predetermined size.

11. The address region detection apparatus according to claim 8, wherein the finding means includes:

deleting means for deleting the pixel region smaller than a predetermined size.

12. The address region detection apparatus according to claim 8, wherein one of the first and second synthesizing means includes:

fifth synthesizing means for, if there is a non-synthesized pixel region located within a predetermined distance from one rectangular region of one of the plurality of first rectangular regions and the plurality of third rectangular regions, synthesizing the non-synthesized pixel region with the one rectangular region, and if there is a non-synthesized pixel region located outside the predetermined distance, deleting the non-synthesized pixel region.

13. The address region detection apparatus according to claim 8, wherein at least one of the second and fourth synthesizing means includes:

deleting means for deleting one rectangular region of one of the plurality of first rectangular regions and the plurality of third rectangular regions, if the one rectangular region has at least a predetermined size in one of a direction of synthesis and a direction perpendicular to the direction of synthesis.

14. The address region detection apparatus according to claim 8, wherein at least one of the second and fourth synthesizing means includes;

deleting means for deleting one rectangular region of one of the plurality of first rectangular regions and the plurality of third rectangular regions, if the one rectangular region has at most a predetermined size in one of a direction of synthesis and a direction perpendicular to the direction of synthesis.

15. The address region detection apparatus according to claim 8, wherein each of the plurality of first rectangular regions and each of the plurality of third rectangular regions has a width in a direction of synthesis and a length in a direction perpendicular to the direction of synthesis, and at least one of the second and fourth synthesizing means includes:

deleting means for deleting one rectangular region of the plurality of first rectangular regions and the plurality of third rectangular regions, if a ratio of the width to the length of the one rectangular region is outside a predetermined range.

16. The address region detection apparatus according to claim 8, wherein the second synthesizing means includes:

first distance measuring means for synthesizing the plurality of first rectangular regions only when a distance between two adjacent ones of the plurality of first rectangular regions in a direction of synthesis of the second synthesizing means is smaller than a set value; and wherein the fourth synthesizing means includes:

second distance measuring means for synthesizing the plurality of third rectangular regions only when a distance between two adjacent ones of the plurality of third rectangular regions in a direction of synthesis of the fourth synthesizing means is smaller than the set value.

17. The address region detection apparatus according to claim 8, wherein the second synthesizing means includes:

first distance measuring means for synthesizing the plurality of first rectangular regions only when a distance between two adjacent ones of the plurality of first rectangular regions in a direction perpendicular to a direction of synthesis of the second synthesizing means is smaller than a set value;

and wherein the fourth synthesizing means includes:

second distance measuring means for synthesizing the plurality of third rectangular regions only when a distance between two adjacent ones of the plurality of third rectangular regions in a direction perpendicular to a direction of synthesis of the fourth synthesizing means is smaller than the set value.

18. The address region detection apparatus according to claim 8, wherein the second synthesizing means includes:

first distance measuring means for synthesizing the plurality of first rectangular regions only when a distance between beginning positions of two adjacent ones of the plurality of first rectangular regions in a direction of synthesis of the second synthesizing means is smaller than a set value;

and wherein the fourth synthesizing means includes:

second distance measuring means for synthesizing the plurality of third rectangular regions only when a distance between beginning positions of two adjacent ones of the plurality of third rectangular regions in a direction of synthesis of the fourth synthesizing means is smaller than the set value.

19. The address region detection apparatus according to claim 8, wherein the second synthesizing means includes:

first distance measuring means for synthesizing the plurality of first rectangular regions only when a distance between beginning positions of two adjacent ones of the plurality of first rectangular regions in a direction perpendicular to a direction of synthesis of the second synthesizing means is smaller than a set value;

and wherein the fourth synthesizing means includes:

second distance means for synthesizing the plurality of third rectangular regions only when a distance between beginning positions of two adjacent ones of the plurality of third rectangular regions in a direction perpendicular to a direction of synthesis of the fourth synthesizing means is smaller than the set value.

20. An address region detection apparatus comprising:

converting means for converting an image having address information on a postal matter to a digital image signal formed of a digital electronic signal;

finding means for finding a pixel region associated with the digital image signal in accordance with the digital image signal;

first synthesizing means for synthesizing the pixel region in a first direction so as to form a plurality of first rectangular regions;

second synthesizing means for synthesizing the plurality of first rectangular regions in a second direction perpendicular to the first direction so as to form a second rectangular region; and address region detecting means for detecting an address region including the address information by evaluating the plurality of first rectangular regions and the second rectangular region.

21. The address region detection apparatus according to claim 20, wherein the first direction is horizontal.

22. The address region detection apparatus according to claim 20, wherein the first direction is vertical.

23. A method of detecting an address region on a postal matter comprising steps of:

converting an image having address information on postal matter to a digital image signal formed of a digital electronic signal;

finding a pixel region associated with the digital image signal in accordance with the digital image signal;

synthesizing the pixel region in a direction of a character line so as to form a plurality of character line rectangular regions; and synthesizing the plurality of character line rectangular regions in a direction perpendicular to the character line, thereby detecting an address region including the address information.

24. A method of detecting an address region on a postal matter comprising steps of:

converting an image having address information on postal matter to a digital image signal formed of a digital electronic signal;

finding a pixel region associated with the digital image signal in accordance with the digital image signal;

synthesizing the pixel region in a first direction so as to form a plurality of first rectangular regions;

synthesizing the plurality of first rectangular regions in a second direction perpendicular to the first direction so as to form a second rectangular region;

synthesizing the pixel region in the second direction so as to form a plurality of third rectangular regions;

synthesizing the plurality of third rectangular regions in the first direction so as to form a fourth rectangular region; and detecting an address region including the address information by evaluating the second rectangular region and the fourth rectangular region.

25. A method of detecting an address region on a postal matter comprising steps of:

converting an image having address information on a postal matter to a digital image signal formed of a digital electronic signal;

finding a pixel region associated with the digital image signal in accordance with the digital image signal;

synthesizing the pixel region in a first direction so as to form a plurality of first rectangular regions;

synthesizing the plurality of first rectangular regions in a second direction perpendicular to the first direction so as to form a second rectangular region; and detecting an address region including the address information by evaluating the plurality of first rectangular regions and the second rectangular region.

* * * * *